United States Patent
Ishii et al.

(10) Patent No.: US 10,638,072 B2
(45) Date of Patent: Apr. 28, 2020

(54) CONTROL APPARATUS, IMAGE PICKUP APPARATUS, AND CONTROL METHOD FOR PERFORMING NOISE CORRECTION OF IMAGING SIGNAL

(71) Applicant: CANON KABUSHIKI KAISHA, Tokyo (JP)

(72) Inventors: Mie Ishii, Tokyo (JP); Hirokazu Kobayashi, Tokyo (JP); Koji Oshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 15/245,705

(22) Filed: Aug. 24, 2016

(65) Prior Publication Data

US 2017/0064226 A1    Mar. 2, 2017

(30) Foreign Application Priority Data

Aug. 28, 2015  (JP) ................................. 2015-168509

(51) Int. Cl.
| | |
|---|---|
| *H04N 5/361* | (2011.01) |
| *H04N 5/232* | (2006.01) |
| *H04N 5/217* | (2011.01) |
| *H04N 5/378* | (2011.01) |
| *H04N 5/369* | (2011.01) |

(Continued)

(52) U.S. Cl.
CPC ............. *H04N 5/361* (2013.01); *G02B 7/346* (2013.01); *H04N 5/2175* (2013.01); *H04N 5/23212* (2013.01); *H04N 5/23245* (2013.01); *H04N 5/359* (2013.01); *H04N 5/3696* (2013.01); *H04N 5/378* (2013.01)

(58) Field of Classification Search
CPC ...... H04N 5/361; H04N 5/378; H04N 5/2175; H04N 5/359; H04N 5/23245; H04N 5/3696; H04N 5/23212; G02B 3/0056
See application file for complete search history.

(56) References Cited

U.S. PATENT DOCUMENTS

2012/0044394 A1* 2/2012 Komiya ............... H04N 5/3456
348/266
2012/0176532 A1* 7/2012 Hara ..................... G03B 13/36
348/352

(Continued)

FOREIGN PATENT DOCUMENTS

JP      3774597 B       5/2006
JP      2013-106194 A   5/2013

*Primary Examiner* — Lin Ye
*Assistant Examiner* — Tuan H Le
(74) *Attorney, Agent, or Firm* — Cowan, Liebowitz & Latman, P.C.

(57) ABSTRACT

A control apparatus (106) includes an acquirer (106a) which acquires a first imaging signal that is read in a first mode from a first pixel area of an image sensor and a second imaging signal that is read in a second mode from a second pixel area of the image sensor, the image sensor including a plurality of photoelectric converters corresponding to a single microlens, and an image processor (106b) which performs noise reduction processing on the first and second imaging signals, the first mode is a mode in which pixel signals of photoelectric converters are added to each other to be read from the image sensor, and the second mode is a mode in which a pixel signal of at least one of the photoelectric converters is read independently as a predetermined signal.

17 Claims, 18 Drawing Sheets

(51) Int. Cl.
*H04N 5/359* (2011.01)
*G02B 7/34* (2006.01)

(56) References Cited

U.S. PATENT DOCUMENTS

2014/0285707 A1\* 9/2014 Ogawa ................. H04N 5/3572
348/353
2014/0362279 A1\* 12/2014 Takeuchi ........... H04N 5/23212
348/349

\* cited by examiner

| No. | DEFECT ADDRESS [x] | DEFECT ADDRESS [y] | DEFECT LEVEL [mV] | TYPE OF DEFECT |
|---|---|---|---|---|
| 1 | 100 | 45 | 120 | WHITE FLAW |
| 2 | 150 | 65 | 55 | WHITE FLAW |
| 3 | 1014 | 77 | 100 | LEAKAGE |
| 4 | 580 | 85 | −70 | LEAKAGE |
| 5 | 1477 | 90 | 25 | LEAKAGE |
| ⋮ | ⋮ | ⋮ | ⋮ | ⋮ |
| N | | | | |

| | CORRECTION LEVEL |
|---|---|
| ISO100 | 128mV |
| ISO200 | 64mV |
| ISO400 | 32mV |
| ISO800 | 16mV |
| ISO1600 | 8mV |
| ISO3200 | 4mV |

CONTROL APPARATUS, IMAGE PICKUP APPARATUS, AND CONTROL METHOD FOR PERFORMING NOISE CORRECTION OF IMAGING SIGNAL

BACKGROUND OF THE INVENTION

Field of the Invention

The present invention relates to an image pickup apparatus which performs a noise correction of an imaging signal.

Description of the Related Art

Recently, multifunction of image pickup apparatus using an image sensor such as a CMOS sensor is achieved in order to meet various needs. For example, the image pickup apparatus which is capable of acquiring an incident direction of light and distance information, as well as a light intensity distribution, is proposed.

Japanese Patent No. 3774597 discloses an image sensor which is capable of performing focus detection by using signals obtained from the image sensor. A photodiode (hereinafter, referred to as a "PD") that corresponds to (i.e., shares) a single microlens is divided into two PDs (divided PDs), and each of the divided PDs is configured to receive light of a different pupil plane from each other of an imaging lens. Outputs of the two divided PDs are compared to perform the focus detection. Furthermore, the output signals from the two divided PDs constituting a unit pixel can be added to obtain a normal photographed image.

Japanese Patent Laid-open No. 2013-106194 discloses a method of reading a first pixel signal of pupil-divided PDs (two pixels) in a first operation, reading an addition signal obtained by adding the second pixel signal to the first pixel signal without resetting the first pixel signal in a second operation, and subtracting the first pixel signal from the addition signal to obtain the second pixels signal. If it is not necessary to perform focus detection, signal reading can be performed only by the second operation, and accordingly the reading time can be reduced.

When each unit pixel includes a plurality of PDs as (disclosed in Japanese Patent No. 3774597, a time required for reading signals of all PDs is increased, and accordingly a frame rate is lowered. In the method disclosed in Japanese Patent Laid-open No. 2013-106194, the reading time can be reduced, but further reduction of the reading time is desired in order to increase the number of pixels and improve the frame rate.

As a method of reducing the reading time in a frame, there is a method of restricting pixels that is to be used for the focus detection. For example, each of signals of divided PDs in the unit pixel is read for a row which is to be used for focus detection processing, and the signals of the divided PDs are added to read only a signal for an image generation with respect to a row which is not to be used for the focus detection processing, and thus the reading time can be reduced. In this case, the individual output signals of the divided. PDs which are read as focus detection signals can be added to be used as pixel signals for a photographed image. However, if the signal reading method or the method of adding the output signals of the divided PDs varies depending on a row (i.e., depending on whether or not the row is to be used for the focus detection processing), a difference of a noise level or the like occurs, and the resulting photographed image is deteriorated.

SUMMARY OF THE INVENTION

The present invention provides a control apparatus, an image pickup apparatus, and a control method which are capable of reducing a deterioration of a captured image while improving the speed of acquiring the captured image and performing focus detection.

A control apparatus as one aspect of the present invention includes an acquirer configured to acquire a first imaging signal that is read in a first mode from a first pixel area of an image sensor and a second imaging signal that is read in a second mode from a second pixel area different from the first pixel area of the image sensor, the image sensor including a plurality of photoelectric converters that correspond to a single microlens, and an image processor configured to perform noise reduction processing on the first imaging signal and the second imaging signal, the first mode is a mode in which pixel signals of the plurality of photoelectric converters are added to each other to be read from the image sensor, and the second mode is a mode in which a pixel signal of at least one of the plurality of photoelectric converters is read independently as a predetermined signal.

A control apparatus as another aspect of the present invention includes an acquirer configured to acquire a first imaging signal that is read in a first mode from a first pixel area of an image sensor and a second imaging signal and a focus detection signal that are read in a second mode from a second pixel area different from the first pixel area of the image sensor, the image sensor including a plurality of photoelectric converters that correspond to a single microlens, and an image processor configured to perform noise reduction processing on the first imaging signal and the second imaging signal differently from each other, and a reading period in the second mode is longer than a reading period in the first mode.

An image pickup apparatus as another aspect of the present invention includes an image sensor including a plurality of photoelectric converters that correspond to a single microlens, an acquirer configured to acquire a first imaging signal that is read in a first mode from a first pixel area of an image sensor and a second imaging signal that is read in a second mode from a second pixel area different from the first pixel area of the image sensor, and an image processor configured to perform noise reduction processing on the first imaging signal and the second imaging signal, the first mode is a mode in which pixel signals of the plurality of photoelectric converters are added to each other to be read from the image sensor, and the second mode is a mode in which a pixel signal of at least one of the plurality of photoelectric converters is read independently as a predetermined signal.

A control method as another aspect of the present invention includes the steps of acquiring a first imaging signal that is read in a first mode from a first pixel area of an image sensor and a second imaging signal that is read in a second mode from a second pixel area different from the first pixel area of the image sensor, the image sensor including a plurality of photoelectric converters that correspond to a single microlens, and performing noise reduction processing on the first imaging signal and the second imaging signal, the first mode is a mode in which pixel signals of the plurality of photoelectric converters are added to each other to be read from the image sensor, and the second mode is a mode in which a pixel signal of at least one of the plurality of photoelectric converters is read independently as a predetermined signal.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
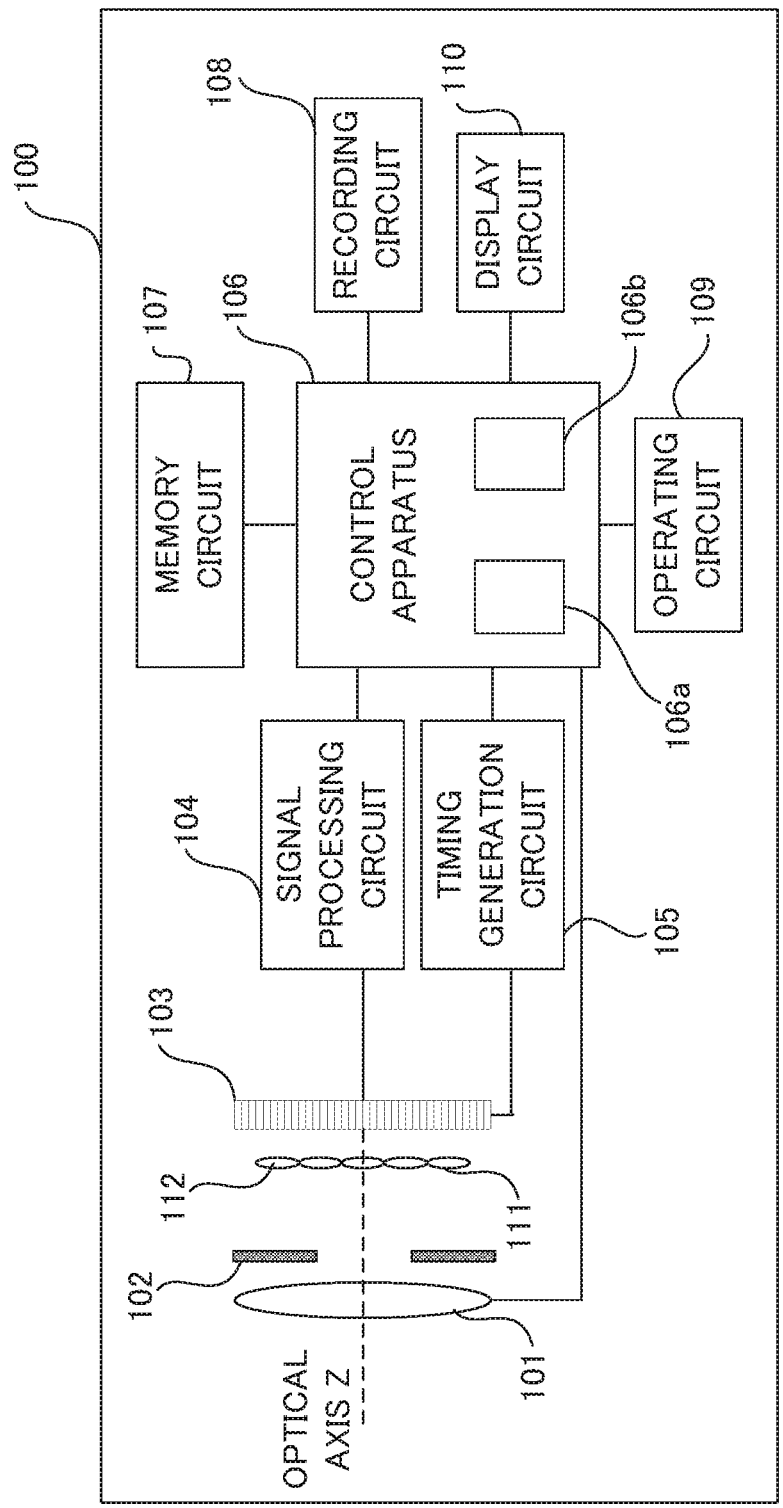
FIG. 1 is a block, diagram of an image pickup apparatus in each embodiment.

First, an image pickup apparatus in a first embodiment of the present invention will be described. FIG. 1 is a block diagram of an image pickup apparatus 100 in this embodiment. In the image pickup apparatus 100, an image pickup optical system includes an imaging lens 101 and an aperture stop 102 (lens stop). An object image (optical image) formed via the image pickup optical system is received by an image sensor 103 (image pickup element) including a microlens array 111. Light passing through the imaging lens 101 is imaged near a focus position of the imaging lens 101. The microlens array 111 includes a plurality of microlenses 112. The microlens array 111 is disposed near the focus position of the imaging lens 101 such that light passing through pupil regions of the imaging lens 101 different from each other is divided to be emitted for each pupil region.

The image sensor 103 includes a photoelectric converter such as a CMOS sensor, and it photoelectrically converts the optical image formed via the image pickup optical system (imaging lens 101) to output an image signal. In this embodiment, the image sensor 103 is configured so that a plurality of pixels are arranged to correspond to a single microlens 112. In this configuration, the image sensor 103 receives the emitted light that is divided by the microlens 112 for each pupil region (divided pupil region) while maintaining division information to be converted into the image signal where data processing can be performed. A signal processing circuit 104 performs various corrections such as a signal amplification and a reference level adjustment and performs sorting of data on the image signal output from the image sensor 103. A timing generation circuit 105 outputs a drive timing signal to the image sensor 103 and the signal processing circuit 104.

A control apparatus 106 (entire controlling and processing circuit, or controller) performs drive and control of a whole of the image pickup apparatus 100 such as the image sensor 103 and the signal processing circuit 104. The control apparatus 106 performs correlation calculation of an A image and a B image and focus detection described below and also performs predetermined image processing and defective correction with respect to the image signal output from the signal processing circuit 104. The control apparatus 106 includes an acquisition circuit 106a (acquisition unit or acquirer) and an image processing circuit 106b (image processing unit or image processor) in order to perform noise reduction processing described below. These specific operations will be described below. Each of a memory circuit 107 and a recording circuit 108 is a recording medium such as a non-volatile memory and a memory card that records and stores the image signal output from the control apparatus 106 and the like. An operating circuit 109 receives a signal from an operating member of the image pickup apparatus 100, and it reflects a command (instruction) by a user to the control apparatus 106. A display circuit 110 displays a photographed image (captured image), a live-view image, or various setting images.

In this embodiment, the image pickup apparatus 100 includes an image pickup optical system including the imaging lens 101 and an image pickup apparatus body including the image sensor 103 integrated with each other.

However, this embodiment is not limited thereto and the image pickup optical system (interchangeable lens) may be removably attached to the image pickup apparatus body.

Next, referring to FIGS. 2 and 3, the relationship of the imaging lens 101, the microlens array 111, and the image sensor 103 in the image pickup apparatus 100 of this embodiment, a definition of a pixel, and a principle of the focus detection by a pupil division method will be described.

Figure 2:
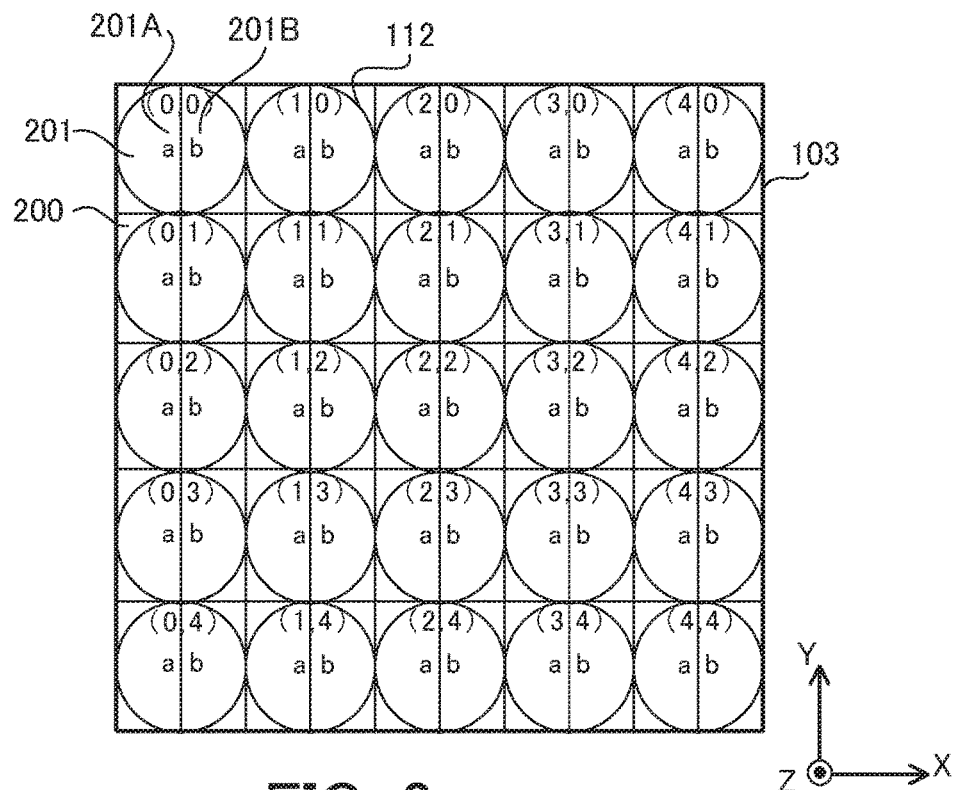
FIG. 2 is a diagram of a pixel array of an image sensor in each embodiment.

FIG. 2 is a diagram of a pixel array of the image sensor 103, and it illustrates a diagram when the image sensor 103 and the microlens array 111 are seen in a direction of an optical axis Z (in an optical axis direction) in FIG. 1. In this embodiment, a pixel corresponding to an individual microlens 112 that constitutes the microlens array 111 is defined as a unit pixel 200. A plurality of (i.e., two) divided pixels (a plurality of subpixels 201 or photoelectric converters) corresponding to (i.e., sharing) a single microlens 112 are arranged in an X axis direction that is orthogonal to the optical axis direction. In this embodiment, the two divided pixels which are arranged with respect to the single microlens 112 (i.e., which share the single microlens 112) are defined as subpixels 201A and 201B, respectively. While the number of the divided pixels are assumed to be two in this embodiment, this embodiment can be applied also to a configuration where the number of the divided pixels are other than two (for example, four).

Figure 3:
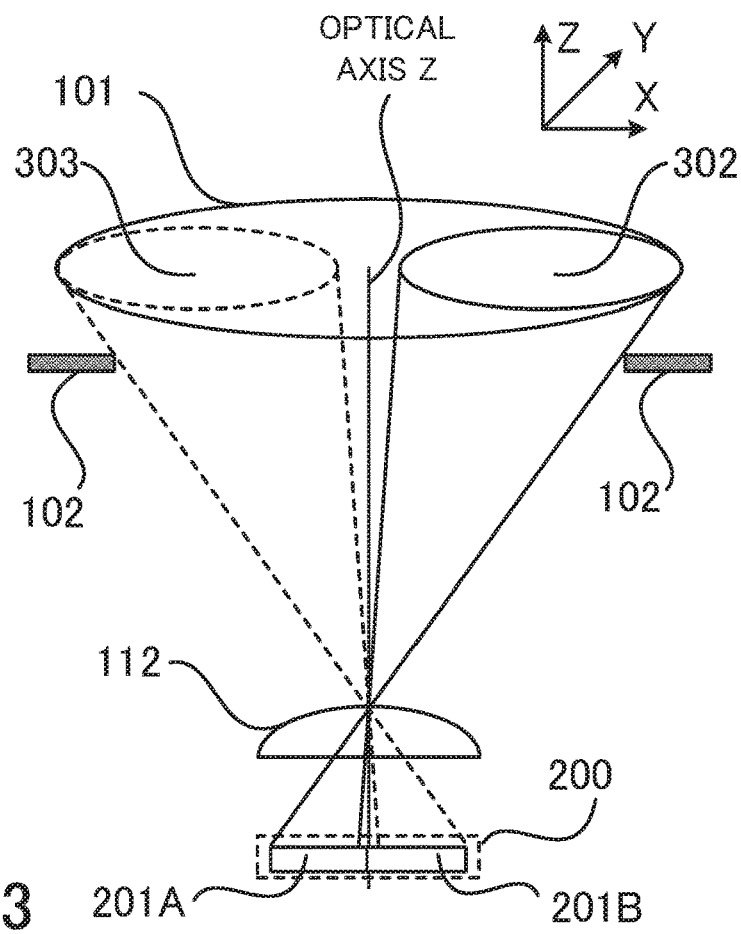
FIG. 3 is a conceptual diagram of light beams that are emitted from an exit pupil of an imaging lens and that are incident on a unit pixel in each embodiment.

FIG. 3 is a conceptual diagram of light beams that are emitted from an exit pupil of the imaging lens 101 and that are incident on the unit pixel 200, and it is a diagram when a situation where the light beams emitted from the imaging lens 101 pass through the single microlens 112 to be received by the unit pixel 200 is seen in a direction perpendicular to the optical axis Z (Y axis direction).

In FIG. 3, reference numerals 302 and 303 denote pupil regions (exit pupils or divided pupil regions) of the imaging lens 101. Reference numeral 102 denotes an aperture stop (lens stop). Light beams passing through the pupil regions 302 and 303 are incident on the unit pixel 200 around the optical axis Z as a center. As illustrated in FIG. 3, the light beam passing through the pupil region 302 is received by the subpixel 201A via the microlens 112, and the light beam passing through the pupil region 303 is received by the subixel 201B via the microlens 112. As described above, the subpixels 201A and 202B receive the light beams passing through different regions (divided pupil regions) in the exit pupil of the imaging lens 101, respectively.

Output signals (an output signal group) from the subpixels 201A (divided pixel) that perform pupil division of the light beam emitted from the imaging lens 101 are obtained from the plurality of unit pixels 200 arrayed in the X axis direction, and an object image formed by the output signal group is defined as an A image (A image signal or focus detection signal). Similarly, output signals (an output signal group) from the subpixels 201B are obtained from the plurality of unit pixels 200 arrayed in the X axis direction, and an object image formed by the output signal group is defined as a B image (B image signal or focus detection signal). For example, the A image signal and the B image signal can also be used as signals (predetermined signals) for performing refocus processing or creating a distance map, in addition to being used as the focus detection signals.

Then, a correlation calculation is performed on the A image signal and the B image signal to detect an image shift amount (pupil division phase difference) Furthermore, by multiplying a conversion coefficient determined depending on a focus position of the imaging lens 101 and the optical system by the image shift amount, a focus position corresponding to an arbitrary object position in an image can be calculated. Focus control of the imaging lens 101 is performed based on the calculated focus position (focus position information), and accordingly it is possible to perform the imaging-plane phase difference AF. Furthermore, the A image signal and the B image signal are combined (i.e., added) to generate an A+B image signal, and the A+B image signal can be used as a normal photographed image (captured image).

Figure 4:
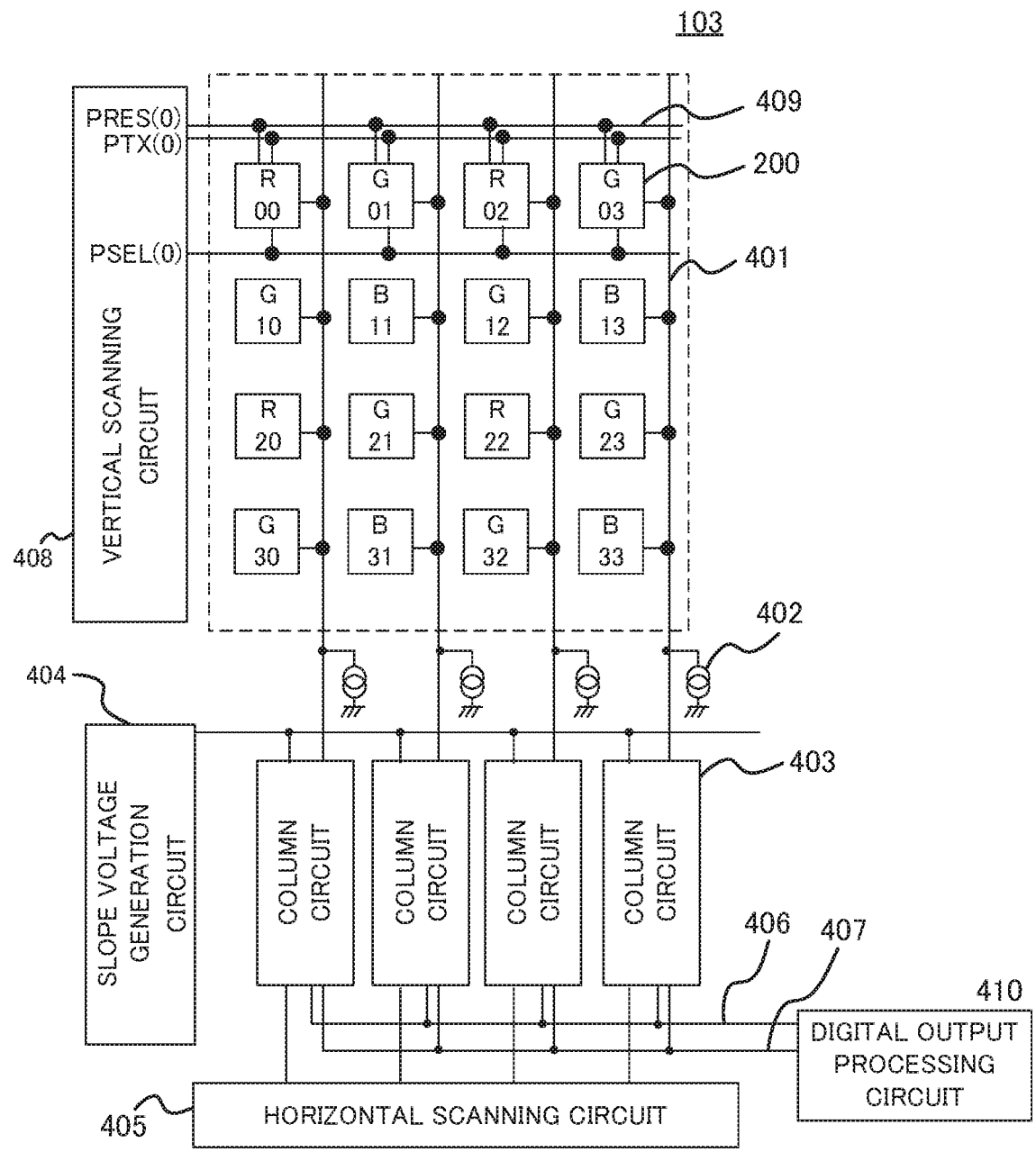
FIG. 4 is a block diagram of the image sensor in each embodiment.

Next, referring to FIGS. 4 and 5, configuration of the image sensor 103 will be described. FIG. 4 is a block diagram of illustrating the configuration of the image sensor 103 in this embodiment. In the image sensor 103, the plurality of unit pixels 200 are disposed in a matrix (in two dimensions). In FIG. 4, a total of 16 unit pixels 200 (4 rows and 4 columns) is illustrated, and in reality the image sensor 103 includes millions or tens of millions of the unit pixels 200. The unit pixels 200 are provided with color filters of red (R), green (G), and blue (B) in the Bayer array. In FIG. 4, the character and digit described in each of the unit pixels 200 indicate a color (R, G, or B) of the pixel and an address (00 to 33) respectively. For example, "G01" indicates a G (green) pixel at 0th row and 1st column. Each unit pixel 200 outputs a pixel signal to a vertical output line 401. Each vertical output line 401 is connected to a current source 402.

A column circuit 403 inputs the pixel signal from the vertical output line 401. The column circuit 403 performs an analog-to-digital conversion (A/D conversion) on the image signal (pixel signal). A slope voltage generation circuit 404 generates a slope voltage that is used for the A/D conversion by the column circuit 403. The signal obtained by performing the A/D conversion by the column circuit 403 is sequentially output to an outside of the image sensor 103 via horizontal output lines 406 and 407 and a digital output processing circuit 410 according to a drive of the horizontal scanning circuit 405. A vertical scanning circuit 408 performs a selection and a drive of the targeted row based on control signals PRES, PTX, and PSEL via a signal line 409 connected to each row. In FIG. 4, the signal line 409 is described only for 0th row, but in reality it is provided to each row.

Figure 5:
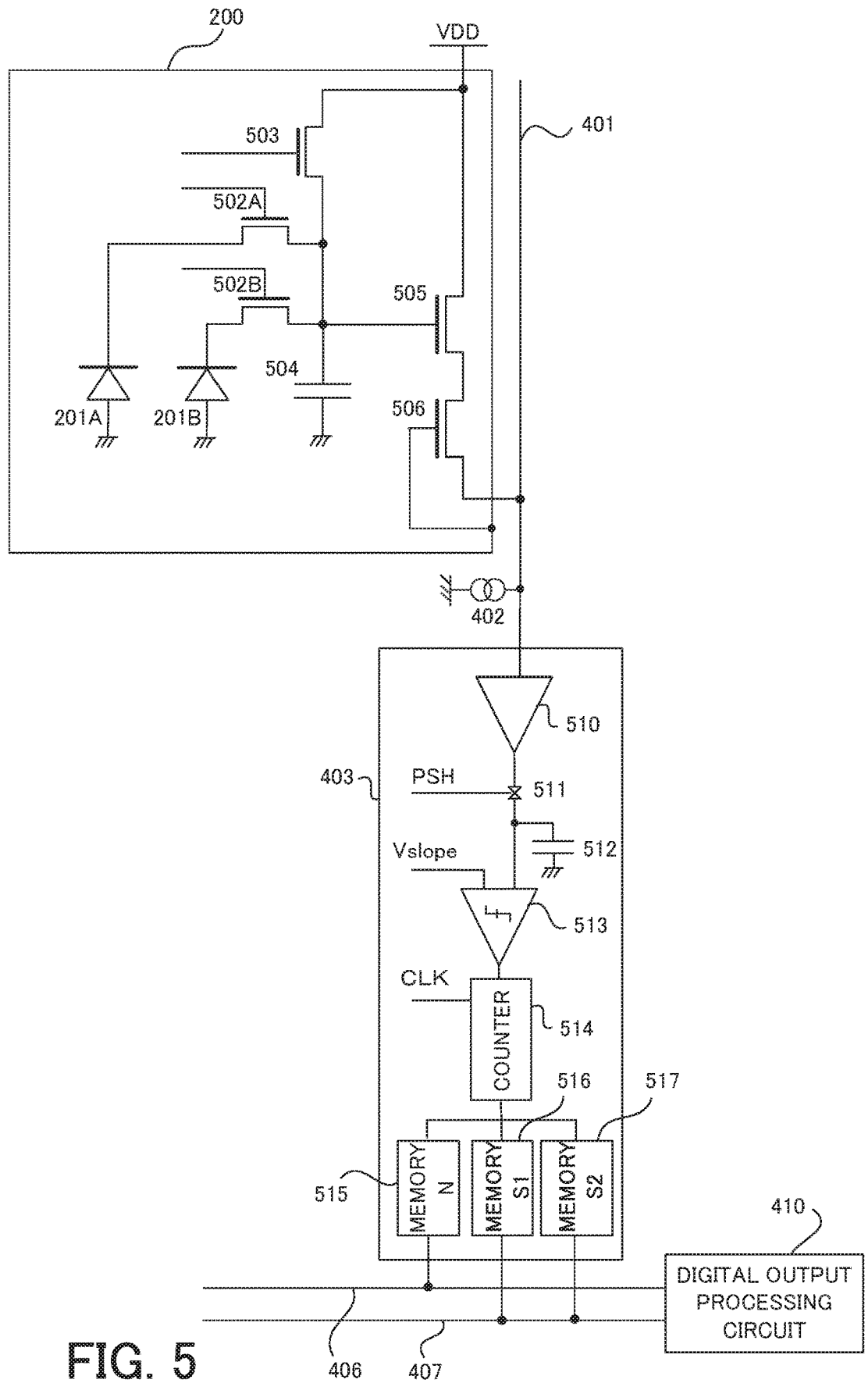
FIG. 5 is an explanatory diagram of a pixel circuit and a column circuit of the image sensor in a first embodiment.

FIG. 5 is an explanatory diagram of a pixel circuit of the unit pixel 200 and the column circuit 403 in the image sensor 103. In the unit pixel 200, A PD 201A (subpixel) is connected to a transfer switch 502A, and A PD 201B (subpixel) is connected to a transfer switch 502B. Charges generated in the subpixels 201A and 201B are transferred to a common FD 504 (floating diffusion) via the transfer switches 502A and 5021B, respectively, and the charges are temporarily stored. When a selecting switch 506 is set to be on, the charges transferred to the FD 504 are output to the vertical output line 401 as a voltage corresponding to the charges via a SF 505 (amplification MOS transistor) that constitutes a source follower amplifier. The selecting switch 506 is controlled for each row, and pixels signals of the selected rows are collectively output to the vertical output line 401. A reset switch 503 resets a potential of the FD 504, and each of potentials of the PDs 201A and 201B to VDD via the transfer switches 502A and 502B, respectively. The transfer switches 502A and 502B, the reset switch 503, and the selecting switch 506 are controlled by control signals PTXA, PTXB, PRES, and PSEL, respectively, via signal lines connected to the vertical scanning circuit 408.

Next, a circuit configuration of the column circuit 403 will be described. An amplification 510 amplifies the signal of the vertical output line 401, and a capacitance 512 is used to maintain a signal voltage. Writing to the capacitance 512 is controlled by a switch 511 that is turned on and off according to a control signal PSH. One of input terminals of a comparator 513 inputs a reference voltage Vslope that is supplied from the slope voltage generation circuit 404 illustrated, in FIG. 4, and the other of the input terminals of the comparator 513 inputs an output of the amplifier 510 written to the capacitance 512. The comparator 513 compares the output of the amplifier 510 with the reference voltage Vslope, and it outputs one of binaries of a low level or a high level depending on the relationship between the output of the amplifier 510 and the reference voltage Vslope. Specifically, the comparator 513 outputs the signal at the low level when the reference voltage Vslope is smaller than the output of the amplifier 510, and on the other hand, it outputs the signal at the high level when the reference voltage Vslope is larger than the output of the amplifier 510. A clock CLK starts its operation simultaneously with the start of the transition of the reference voltage Vslope. Then, a counter 514 increments correspondingly to the clock CLK (count up) when the output of the comparator 513 is at the high level. The counter 514 stops a count signal simultaneously with a change of the output of the comparator 513 to the low level.

A memory 515 stores a digital signal that is obtained by performing the A/D conversion of the signal (hereinafter, referred to as an "N signal") at the reset level of the ED 504. Memories 516 and 517 store digital signals that are obtained by performing the A/D conversion of signals (hereinafter, referred to as "S signals") corresponding to the signals of the PDs 201A and 201B superimposed on the N signal of the FD 504, respectively. Details of the S signals (signals S1 and S2) stored in the memories 516 and 517 will be described below. The signals stored in the memories 515, 516, and 517 are output to an output processing circuit 410 via horizontal output lines 406 and 407 according to the control signals from the horizontal scanning circuit 405. Then, the digital output processing circuit 410 calculates a difference between the S signal and the N signal to output a signal where a reset noise component of the ED 504 as a factor of a noise has been removed.

Figure 6:
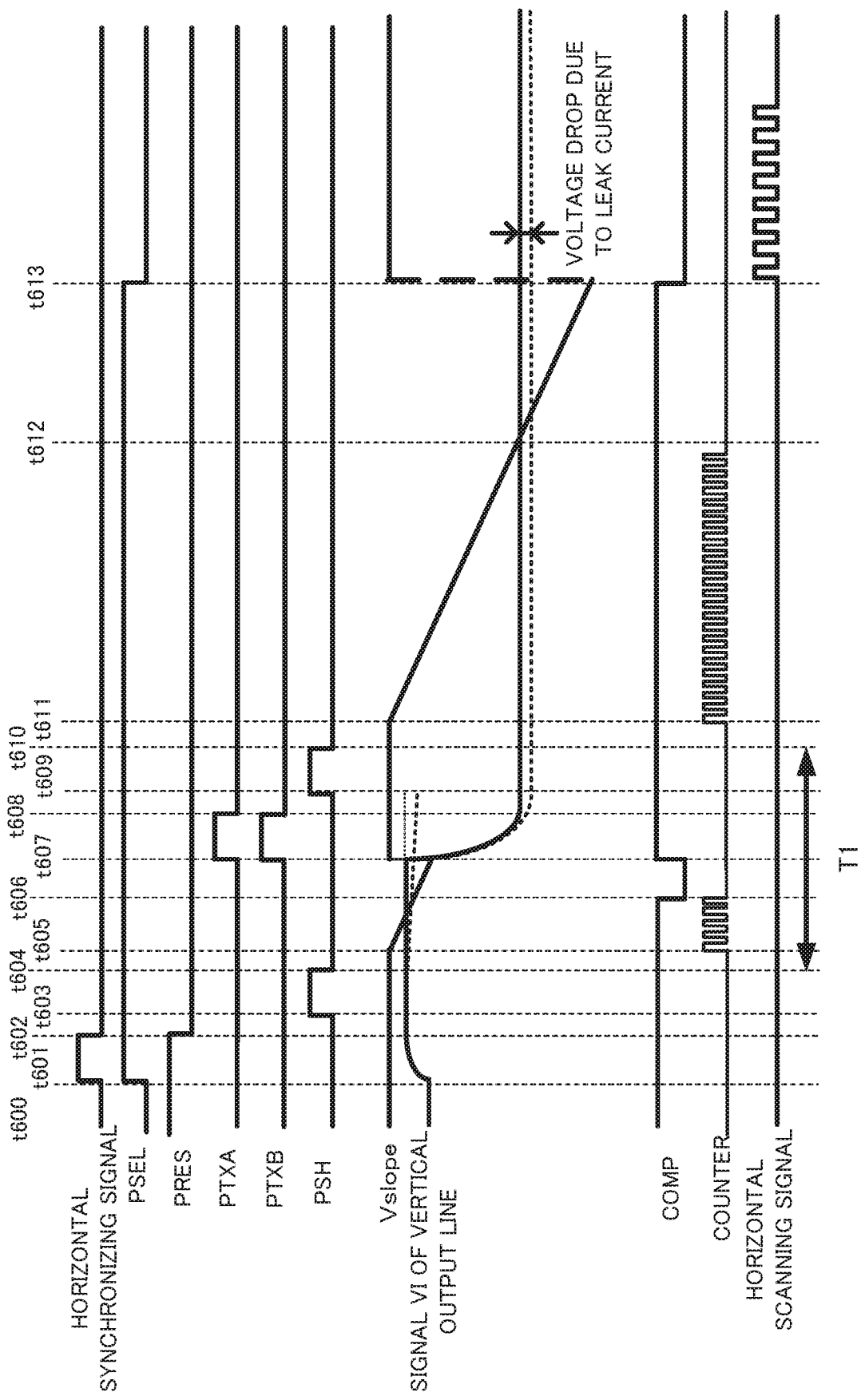
FIG. 6 is a timing chart of illustrating a signal read operation in a normal photographing mode in the first embodiment.
Figure 7:
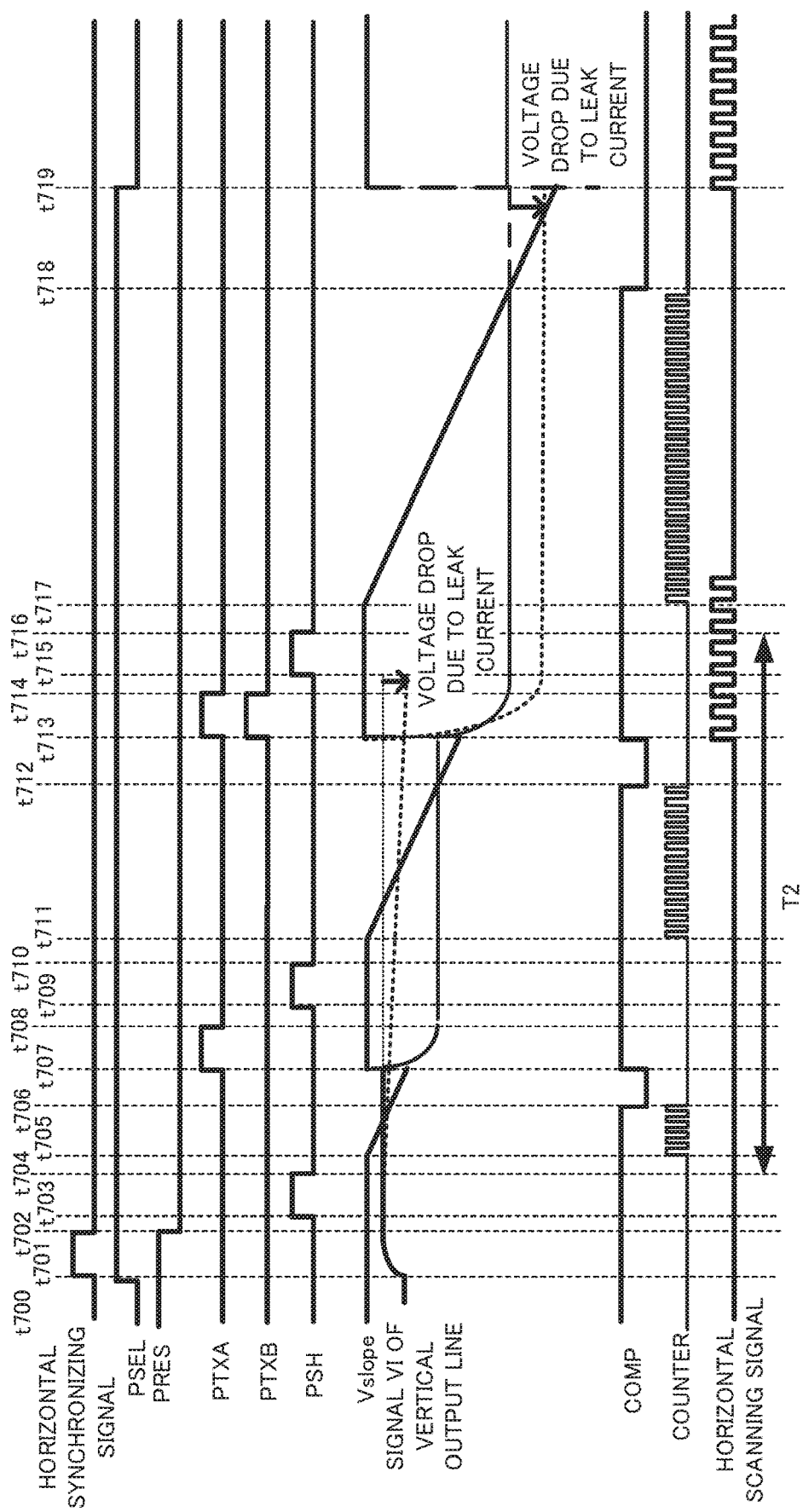
FIG. 7 is a timing chart of illustrating a signal read operation in an imaging-plane phase difference AF mode in the first embodiment.

Next, referring to FIGS. 6 and 7, a signal read operation in each of the normal photographing mode and the imaging-plane phase difference AF mode of the image sensor 103 will be described. In this embodiment, the image sensor 103 has the normal photographing mode (first mode or first drive mode) and the imaging-plane phase difference AF mode (second mode or second drive mode). FIG. 6 is a timing chart of illustrating the operation of the signal read operation in the normal photographing mode. FIG. 7 is a timing chart of illustrating the operation of the signal read operation in the imaging-plane phase difference AF mode. Each of FIGS. 6 and 7 illustrates an example of a charge reading operation from the unit pixel 200 for a row of the image sensor 103 with the circuit configuration illustrated in FIG. 5. FIGS. 6 and 7 schematically illustrate a timing of each drive pulse (control signal), the reference voltage Vslope, the clock CLK, and the horizontal scanning signal (horizontal synchronizing signal). In addition, a signal V1 of the vertical output line at each timing is illustrated. The signal V1 corresponds to a signal level (value) output from the unit pixel 200.

First, referring to FIG. 6, the charge reading operation in the normal photographing mode will be described. Prior to reading of a signal from the PD 201 (divided pixel), the control signal PRES of the reset switch 503 is set to Hi, i.e., high level (time t600). As a result, a gate of the SF 505 is reset to a reset power source voltage. At time t601, the control signal PSEL is set to Hi and thus the SF 505 is in an operation state. Then, the control signal PRES is set to Lo, i.e. low level, at time t602, the reset of the FD 504 is removed. The potential of the FD 504 at this time is read as a reset signal level (N signal) to the vertical output line 401 to be input to the column circuit 403. Subsequently, at times t603 and t604, the control signal PSH is set to Hi and Lo to turn the switch 511 on and off, respectively, and thus the N signal read to the vertical output line 401 is amplified by the amplifier 510 with a desired gain to be maintained in the capacitance 512. The potential of the N signal stored in maintained in the capacitance 512 is input to one of the comparator 513. After the switch 511 is turned off at time t604, from time t605 to time t607, the slope voltage generation circuit 404 decreases the reference voltage Vslope from an initial value with the passage of time. The clock CLK is supplied to the counter 514 simultaneously with the start of the transition of the reference voltage Vslope. A value of the counter 514 increases depending on the digit of the clock CLK. When the reference voltage Vslope input to the comparator 513 becomes the same level as that of the N signal, an output COMP of the comparator 513 is changed to the low level and simultaneously the operation of the counter 514 stops (time t606). The value obtained when the operation of the counter 514 stops corresponds to a value obtained by performing the A/D conversion of the N and it is stored in an N signal memory 515.

Subsequently, at time t607 and time t608 after the digitalized N signal is stored in the N signal memory 515, control signals PTXA and PTXB are sequentially set to Hi and Lo, and thus photocharges accumulated in the PDs 201A and 201B are transferred to the FD 504. In this case, a potential fluctuation of the FD 504 depending on an amount of charges is read as an S signal level (light component+reset noise component (N signal)) to the vertical output line 401 to be input to the column circuit 403. The S signal is amplified by the amplifier 510 with a desired gain, and it is maintained in the capacitance 512 at the timing when the control signal PSH is sequentially set to Hi and Lo to turn the switch 511 on and off at time t609 and t610, respectively. The potential maintained in the capacitance 512 is input to one of the comparator 513. After the switch 511 is turned off at time t610, from time t611 to time t613, the slope voltage generation circuit 404 decreases the reference voltage Vslope from an initial value with the passage of time. The clock CLK is supplied to the counter 514 simultaneously with the start of the transition of the reference voltage Vslope. The value of the counter 514 increases depending on the digit of the clock CLK. When the reference voltage Vslope input to the comparator 513 becomes the same level as that of the S signal, the output COMP of the comparator 513 is changed to the low level and simultaneously the operation of the counter 514 stops (time t612) The value obtained when the operation of the counter 514 stops corresponds to a value obtained by performing the A/D conversion of the S signal, and it is stored in a memory 516 as one of S signal memories. The S signal corresponds to a signal where photocharges accumulated in the PDs 201A and 201B are combined (added) by the FD 504 to be read, and hereinafter it is referred to as an "S (A+B) signal".

Subsequently, the horizontal scanning circuit 405 reads the signals stored in the memories 515 and 516. From time t613, the horizontal scanning circuit 405 sequentially operates for each column circuit 403, and thus the signals stored in the memories 515 and 516 pass through the horizontal output lines 406 and 407, respectively, to be sent to the digital output processing circuit 410 to calculate a differential signal level (light component).

As described above, by setting the control signals PTXA and PTXB to be on at the same time, the charges accumulated in the PDs 201A and 201B are simultaneously transferred to the FD 504 such that an imaging signal can be read. A period of time when the N signal is maintained in the capacitance 512 to time when the S signal is maintained in the capacitance 512 is referred to as an S signal reading period. In the normal photographing mode, a period T1 from time t604 to time t610 is an S(A+B) signal reading period.

Next, referring to FIG. 7, the charge reading operation in the imaging-plane phase difference AF mode will be described. In the imaging-plane phase difference AF mode, both of information on the AF and information on the photography can be acquired. In the imaging-plane phase difference AF mode, the drive during a period up to time t707, i.e., drive until the N signal obtained by the A/D conversion is stored in the memory 515, is the same as the drive during the period up to time t607 in the normal photographing mode, and accordingly descriptions thereof are omitted.

At time t707 and time t708 after the completion of the H signal reading period, the control signal PTXA is set to Hi and Lo, respectively, to transfer photocharges accumulated in the PD 201A to the FD 504. In this case, a potential fluctuation of the PD 504 depending on an amount of charges is read as an S (A) signal level (light component+reset noise component (N signal)) to the vertical output line 401 to be input to the column circuit 403. The S (A) signal is amplified by the amplifier 510 with a desired gain, and it is maintained in the capacitance 512 at the timing when the control signal PSH is sequentially set to Hi and Lo to turn the switch 511 on and of at time t709 and t710, respectively. The potential maintained in the capacitance 512 is input to one of the comparator 513. After the switch 511 is turned off at time t710, from time t711 to time t713, the slope voltage generation circuit 404 decreases the reference voltage slope from an initial value with the passage of time. The clock CLK is supplied to the counter 514 simultaneously with the start of the transition of the reference voltage Vslope. The value of the counter 514 increases depending on the digit of the clock CLK. When the reference voltage Vslope input to the comparator 513 becomes the same level as that of the S (A) signal, the output COMP of the comparator 513 is changed to the low level and simultaneously the operation of the counter 514 stops (time t712). The value obtained when the operation of the counter 514 stops corresponds to a value obtained by performing the A/D conversion of the S (A) signal, and it is stored in a memory 516.

Subsequently, at time t713 and time t714, control signals PTXA and PTXB are sequentially set to Hi and Lo, and thus photocharges accumulated in the PDs 201A and 201B are transferred to the PD 504. In this case, a potential fluctuation of the PD 504 depending on an amount of charges is read as an S(A+B) signal level (light component+reset noise component (N signal)) to the vertical output line 401 to be input to the column circuit 403. The S (A+B) signal is amplified by the amplifier 510 with a desired gain, and it is maintained in the capacitance 512 at the timing when the control signal PSH is sequentially set to Hi and Lo to turn the switch 511 on and off at time t715 and t716, respectively. The potential maintained in the capacitance 512 is input to one of the comparator 513. After the switch 511 is turned off at time t716, from time t717 to time t719, the slope voltage generation circuit 404 decreases the reference voltage Vslope from an initial value with the passage of time. The clock CLK is supplied to the counter 514 simultaneously with the start of the transition of the reference voltage Vslope. The value of the counter 514 increases depending on the digit of the clock CLK. When the reference voltage Vslope input to the comparator 513 becomes the same level as that of the S (A) signal, the output COMP of the comparator 513 is changed to the low level and simultaneously the operation of the counter 514 stops (time t718). The value obtained when the operation of the counter 514 stops corresponds to a value obtained by performing the A/D conversion of the S(A+B) signal, and it is stored in a memory 517 as another one of the S signal memories. A period T2 from time t704 to time t716 is a period of time when the N signal is maintained in the capacitance 512 to time when the S (A+B) signal is maintained in the capacitance 512, and it corresponds to an S (A+B) signal reading period.

Next, steps of reading the signals stored in the memories 515, 516, and 517 by the horizontal scanning circuit 205 will be described. The horizontal scanning circuit 205 sequentially operates each column circuit 403 from time t713 after the S (A) signal is read, and as a result, the signals stored in the memories 515 and 516 pass through the horizontal output lines 406 and 407, respectively, to be sent to the digital output processing circuit 410 to calculate a differential signal level (light component of the A image). The horizontal scanning circuit 205 sequentially operates each column circuit 403 from time t719 after the S (A+B) signal is read. As a result, the signals stored in the memories 515 and 517 pass through the horizontal output lines 406 and 407 to be sent to the digital output processing circuit 410 to calculate a differential signal level (light component of a photographed (captured) image).

As described, above, first, only the control signal PTXA is set to be on to read the A image signal, and then the control signals PTA and PTXB are simultaneously set to be on to read the imaging signal (A+B image signal), and thus both of the information on the AF and the information on the photography can be acquired. The B image signal for the AF can be calculated by subtracting the A image signal from the A+B image signal. The processing is performed by the signal processing circuit 104 or the control apparatus 106.

As illustrated in FIG. 6, the signal V1 (signal level) of the vertical output line decreases with the passage of time due to the influence of leak current by the FD capacitance or the switch received by the pixel. While the reset noise component of the FD 504 as a factor of the noise is typically removed by calculating a difference between the S signal and the N signal, a shift (deviation) of the potential occurs due to the influence of the leak current with increasing a period from a time when the N signal is read to a time when the S signal is read. As a result, it is difficult to perform the noise reduction with high accuracy according to a real value obtained by subtracting the N signal from the S signal (i.e. S signal-N signal), and in the example of FIG. 6, an output value is higher than a light signal level to be read (dashed line indicating the signal V1 of the vertical output line) as a noise influencing the image. An amount of the leak current varies depending on a pixel and the potential may increase depending on a region of the leakage, and accordingly it is preferred that the correction is performed for each pixel individually.

As above, referring to FIGS. 6 and 7, two modes as a method of driving the image sensor 103 are described. The image pickup apparatus 100 can use the normal photographing mode and the imaging-plane phase difference AF mode depending on a scene or an intended use. While both the information on the imaging-plane phase difference AF and the information on the photography can be acquired in the imaging-plane phase difference AF mode, a reading period required for acquiring an image is longer than that in the normal photographing mode and accordingly its frame rate is lowered. In order to avoid this, by mixing rows which are read in the imaging-plane phase difference AF mode with rows which are read in the normal photographing mode in a frame, it is possible to acquire the information on the AF without lowering the frame rate (or while suppressing the decrease of the frame rate). Hereinafter, this mode is referred to as a row-selective imaging-plane phase difference AF mode.

Figures 8, 9:
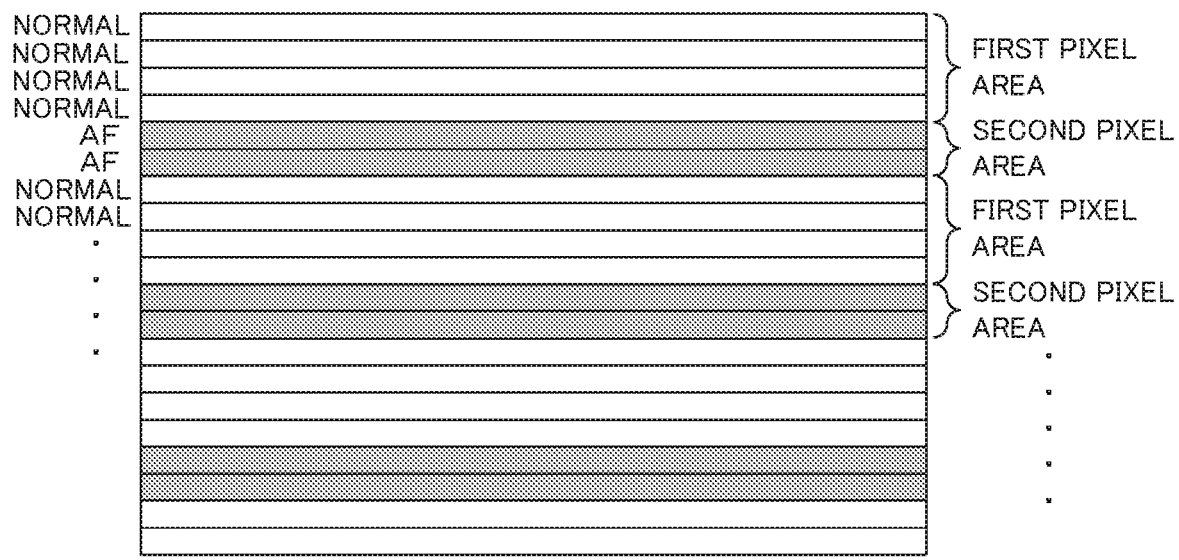
FIG. 8 is an explanatory diagram of a signal read operation in a row-selective imaging-plane phase difference AF mode in the first embodiment.
FIG. 9 is an example of defect correction data stored in a memory of an image pickup apparatus in the first embodiment.

FIG. 8 is an explanatory diagram of the signal reading operation in a pixel area of the image sensor 103 in the row-selective imaging-plane phase difference AF mode. FIG. 8 illustrates a reading mode for each row of the pixel area. In this embodiment, the image sensor 103 is driven so that pixels at the top four rows (first pixel area) are read in the first mode (normal photographing mode) and pixels at the subsequent two rows (second pixel area) are read in the second mode (imaging-plane phase difference AF mode). Thus, the readings in the normal photographing mode and the imaging-plane phase difference AF mode are alternately performed with a predetermined ratio for each row. Each of the first mode and the second mode can be achieved according to the timing chart of FIG. 6 or 7.

In this case, the period (period T1) from the time when the N signal (reset signal) is read to the time when the imaging signal (A+B image signal) is read in the normal photographing mode is different from the period (period T2) from the time when the N signal is read to the time when the imaging signal is read in the imaging-plane phase difference AF mode. The period T2 is longer than the period T1 by the reading of the A image signal. As described above, in the row-selective imaging-plane phase difference AF mode, in one frame, the length of the S signal reading period varies depending on the row. In other words, in the row-selective imaging-plane phase difference AF mode, due to the influence of the leak current, a noise difference occurs depending on the row. When the noise difference is large, a horizontal stripe noise occurs and it causes a deterioration (degradation) of a quality of an image. In order to avoid this, in this embodiment, a defective pixel where an amount of the leak current is large and the noise reduction by subtracting the N signal from the S signal (i.e., S signal-N signal) cannot be performed with high accuracy is determined, and the signal of the determined defective pixel is corrected. In particular, in the row-selective imaging-plane phase difference AF mode, a method of performing an appropriate correction will be described.

Various defective pixels (flaw pixels) are extracted from the image sensor 103 based on image data obtained with conditions of a predetermined drive, a predetermined charge accumulation time, and a predetermined environment temperature for example in its shipment. There is a defect which is caused by dark current depending on temperature or accumulation time as a main defect, and in addition, there is a defect which is caused by leak current. These defective pixels are extracted in the normal photographing mode, and as illustrated in FIG. 9, defective pixel data (information relating to the defective pixel) including addresses, levels of the defect, and types of the defect are created to be stored in a memory (for example, the memory circuit 107) in the image pickup apparatus 100. FIG. 9 is an example of the defective pixel data (data for correcting the defect) stored in the memory of the image pickup apparatus 100. The defective pixel extraction processing may be performed by an external apparatus of the image pickup apparatus 100, or alternatively it may be performed based on image data photographed (captured) by the image pickup apparatus 100 when capturing an image. In other words, the image sensor 103 as a single body (i.e., separately from the image pickup apparatus 100) may perform the processing, or alternatively the image sensor 103 incorporated in the image pickup apparatus 100 may perform the processing. A white flaw (void) of various defects varies depending on a charge accumulation time, temperature, and ISO sensitivity which is set, and accordingly it is preferred that a correction level of the defect is changed depending on an image capturing condition. This can be performed by a known defective pixel correction method. On the other hand, a leak defect is a defect which is caused by the leak current as described above.

Figure 10:
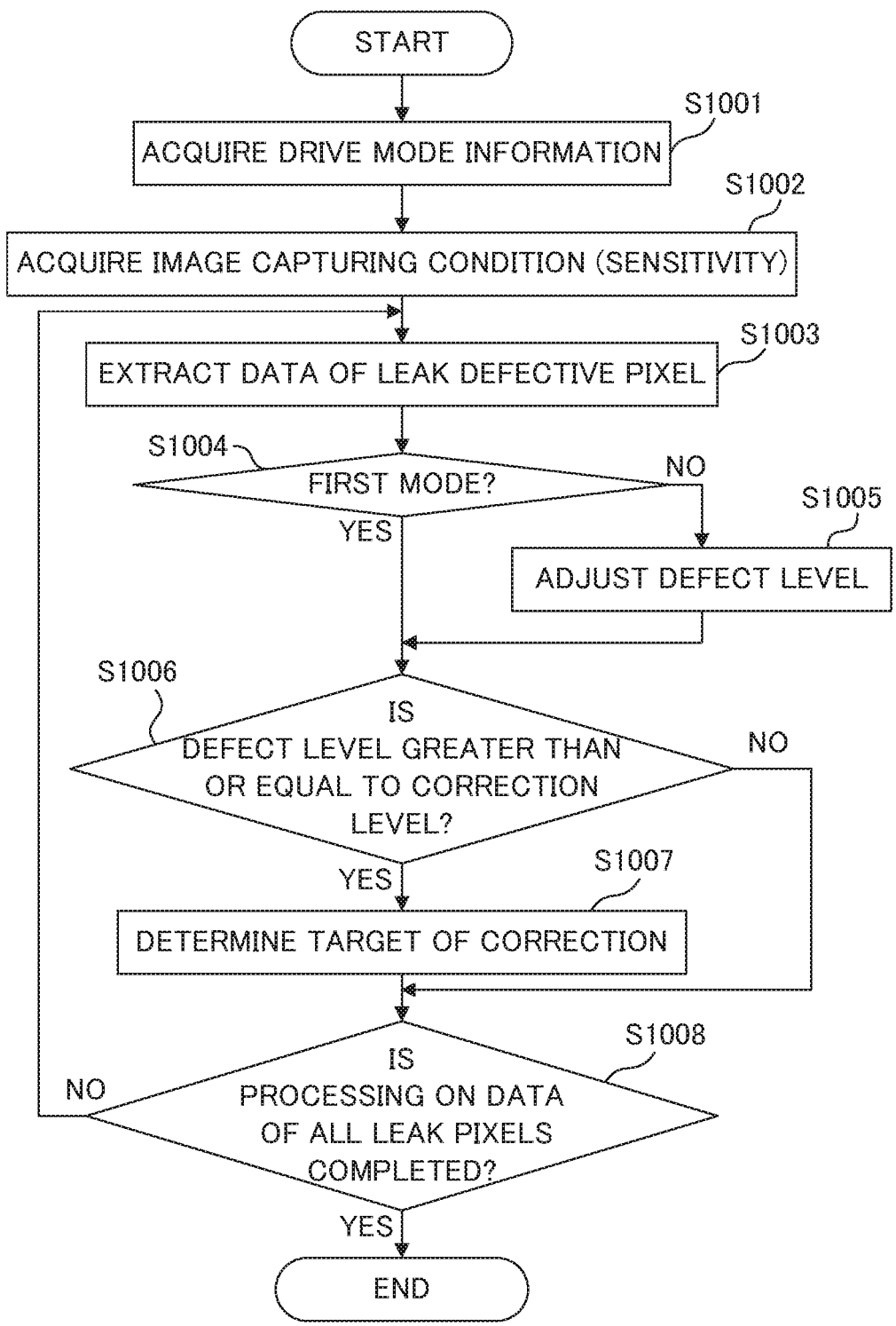
FIG. 10 is a flowchart of illustrating processing of determining a correction object pixel in the first embodiment.

Next, referring to FIG. 10, processing of determining a leak defective pixel including a leak defect as a target of correction will be described. FIG. 10 is a flowchart of illustrating the processing of determining a correction object pixel (leak defective pixel). Each step in FIG. 10 is performed by the control apparatus 106 (the acquisition circuit 106a or the image processing circuit 106b), and the control apparatus 106 (image processing circuit 106b) corrects the leak defective pixel as a target of the correction according to the result of the processing.

First, at step S1001, the control apparatus 106 acquires drive mode information that is set when capturing an image (i.e., during photography). In other words, in the row-selective imaging-plane phase difference AF mode, it acquires information on whether a reading method for each row is performed in the first mode (normal photographing mode) or the second mode (imaging-plane phase difference AF mode). Then, at step S1002, the control apparatus 106 acquires sensitivity during the photography. Subsequently, at step S1003, the control apparatus 106 extracts one of data of leak defective pixels where a type of the defect is "leakage" based on the defective pixel data illustrated in FIG. 9. In the example of the defective pixel data of FIG. 9, Nos. 3, 4, and 5 corresponds to pixels each including a leak defect.

Figures 11, 12:
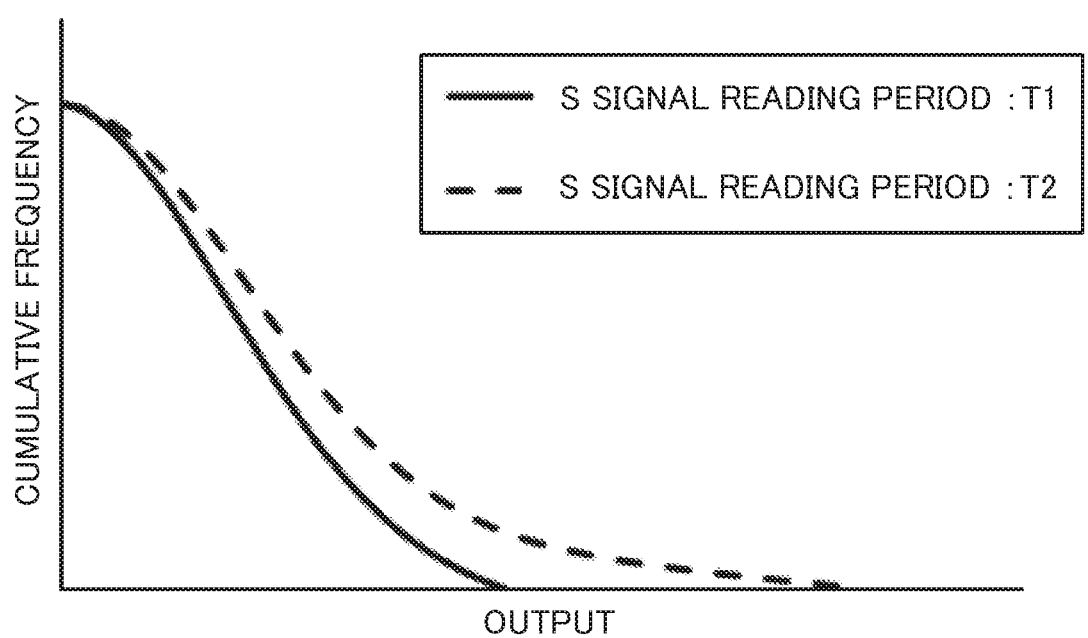
FIG. 11 is an example of the defect correction data stored in the memory of the image pickup apparatus in the first embodiment.
FIG. 12 is a diagram of illustrating a histogram of images for S signal reading periods T1 and T2 as a modification of the first embodiment.

Subsequently, at step S1004, the controller 106 determines whether an address of the extracted defective pixel is read in the first mode or is read in the second mode. When the extracted defective pixel is read in the first mode, the flow proceeds to step S1006. At step S1006, the control apparatus 106 determines whether or not the level of the defect (defect level) extracted at step S1003 is not less than a correction level (i.e., not less than a predetermined threshold value) with respect to the sensitivity acquired at step S1002 according to a table illustrated in FIG. 11. FIG. 11 is an example of data for correcting the defect (i.e., threshold value data of the correction level depending on the sensitivity) that are stored in the memory of the image pickup apparatus 100.

When the level of the extracted defect is not less than the correction level illustrated in FIG. 11, the flow proceeds to step S1007. At step S1007, the control apparatus 106 determines that the extracted leak defective pixel is a target of the correction (i.e., correction object pixel) and it sends the information to the signal processing circuit 104, and the flow proceeds to step S1008. On the other hand, when the level of the extracted defect is less than the correction level (i.e., less than the predetermined value), step S1007 is skipped and the flow proceeds to step S1008 directly.

At step S1008, the control apparatus 106 determines whether or not determination processing (data processing)

has been performed on data of all the leak defective pixels. If there is a leak defective pixel on which the determination processing has not been performed, the flow returns to S1003 and the control apparatus 106 extracts next one of data of the leak defective pixels (data of the next leak defective pixel). Then, steps S1004 to S1008 are repeated. On the other hand, if the determination processing is completed on the data of all the leak defective pixels, the processing is terminated. For example, in the photography with ISO400, the control apparatus 106 corrects the defective pixel where an absolute value of the level of the defect is not less than 32 mV. In other words, in the pixel data illustrated in FIG. 9, the leak defective pixels of Nos. 3 and 4 are targets of the correction (i.e., correction object pixels), and the leak defective pixel of No. 5 is not the target of the correction.

When the address of the defective pixel extracted at step S1004 is read in the second mode, the flow proceeds to step S1005. At step S1005, the control apparatus 106 adjusts the level of the defect extracted at step S1003 depending on the S signal reading period. In this embodiment, the S signal reading period in the first mode is denoted by T1, and the S signal reading period in the second mode is denoted by T2 (T1<T2), and the defect level of the leak defect extracted in the first mode is denoted by L1. In this case, the defect level L2 of the leak defect extracted in the second mode is represented by expression (1) below.

$$L2=(T2/T1)\times L1 \times \alpha \qquad (1)$$

In expression (1), symbol $\alpha$ is an arbitrary coefficient that satisfies a condition of $(T2/T1)\times \alpha > 1$.

Thus, the defect level L2 calculated according to expression (1) is the defect level of the leak defect in the second mode. After calculating the defect level L2, at step S1006, the control apparatus 106 determines whether or not the calculated defect level L2 is not less than the correction level with respect to the sensitivity acquired at step S1002 according to the table of FIG. 11. Then, the control apparatus 106 performs processing of each of steps S1007 and S1008 described above.

As described above, the control apparatus 106 converts the defect level depending on a length of the S signal reading period to determine whether or not to perform the correction of the leak defect. Accordingly, it is possible to perform the correction of the leak defective pixels appropriately. Furthermore, it is not necessary to store defective pixel information corresponding to each drive mode (first mode or second mode) in the memory, and accordingly the reduction of the time for extracting the defective pixels and the reduction of the memory capacity of the image pickup apparatus 100 can be achieved. The correction of the defective pixels can be performed by the control apparatus 106 with the use of a known interpolation method.

As described above, in the row-selective imaging-plane phase difference AF mode where the S signal reading periods are different from each other depending on a row in a frame, the level of the defect correction or the noise reduction processing changes depending on the length of the S signal reading period. Accordingly, it is possible to perform appropriate noise reduction processing with high accuracy. In this embodiment, the drive mode in which the S signal reading periods are different from each other is only an example, and this embodiment is not limited thereto.

In this embodiment, when the second pixel area is read in the second mode, first, the A image signal is read, and then the A+B image signal is read, but this embodiment is not limited thereto. For example, first, the A image signal may be read, and then the B image signal may be read. In this case, the A+B image signal as an imaging signal can be calculated by adding (combining) the A image to the B image signal. The processing is performed by the signal processing circuit 104 or the control apparatus 106.

<Modification>

Next, a modification in this embodiment will be described. As defect and noise correction of an image, there is a real-time defect correction method in which a defective pixel is detected from a photographed image (captured image). The real-time defect correction is also known technology, various methods are disclosed, and basically it determines a pixel as the defective pixel to perform the defect correction if an obtained output of the pixel has a level difference not less than a threshold value previously set with respect to a signal of a peripheral pixel.

FIG. 12 is a diagram of illustrating histograms of images (dark images) for the S image reading periods T1 and T2, and a horizontal axis indicates an output of a pixel signal and a vertical axis indicates a cumulative frequency. The distribution of the histogram is spread horizontally in the second mode corresponding to the S signal reading period T2 and a large amount of noise is included in an image, compared to the first mode corresponding to the S signal reading time T1. As described above, this is because an error of the processing of subtracting the N signal from the S signal (S signal-N signal) in the S signal reading period T2 is larger than that in the S signal reading period T1.

In this modification, considering the difference of the noises, the defect determining threshold value (level) varies depending on the reading mode, i.e., the length of the S signal reading period to perform the real-time defect detection and correction. For example, a threshold value which is to be used for the defect determination in the second mode corresponding to the S signal reading period T2 is set to be lower than a threshold value which is to be used for the defect determination in the first mode corresponding to the S signal reading period T1. Accordingly, corrected amounts of noises can be equal to each other (i.e., the difference of the corrected amounts of noises can be reduced).

It is preferred that the strength of the processing of another noise reduction processing, as well as the real-time defect correction, varies depending on the length of the S signal reading period. This embodiment is suitably applied to a reading mode where the number of pixels of images is decreased to be the lower number of pixels in a moving image mode such as FHD. As a method of lowering the number of pixels, there are a decimating (thinning) method of reading one pixel among three pixels, a combining method of combining two pixels among three pixels, and a combining method of combining three pixels among the three pixels. It is preferred that the level of the noise reduction processing varies depending on the length of the S signal reading period when the processing for the same combining number is performed.

When the defect is detected in real time, a reference pixel may be switched according to whether a peripheral pixel which is used to calculate the level difference is read in the first mode or the second mode. For example, only the pixel which is read in the same mode may be used as the peripheral pixel, or a weighting may be performed on the determination threshold value and the like according to the mode in which the pixel is read.

Second Embodiment

Next, a second embodiment of the present invention will be described. The entire configuration of the image pickup apparatus 100 and the configuration of the image sensor 103 in this embodiment are the same as those in the first embodiment. In this embodiment, the method of reading the pixel signal in the imaging-plane phase difference AF mode is different from that in the first embodiment.

Figure 13:
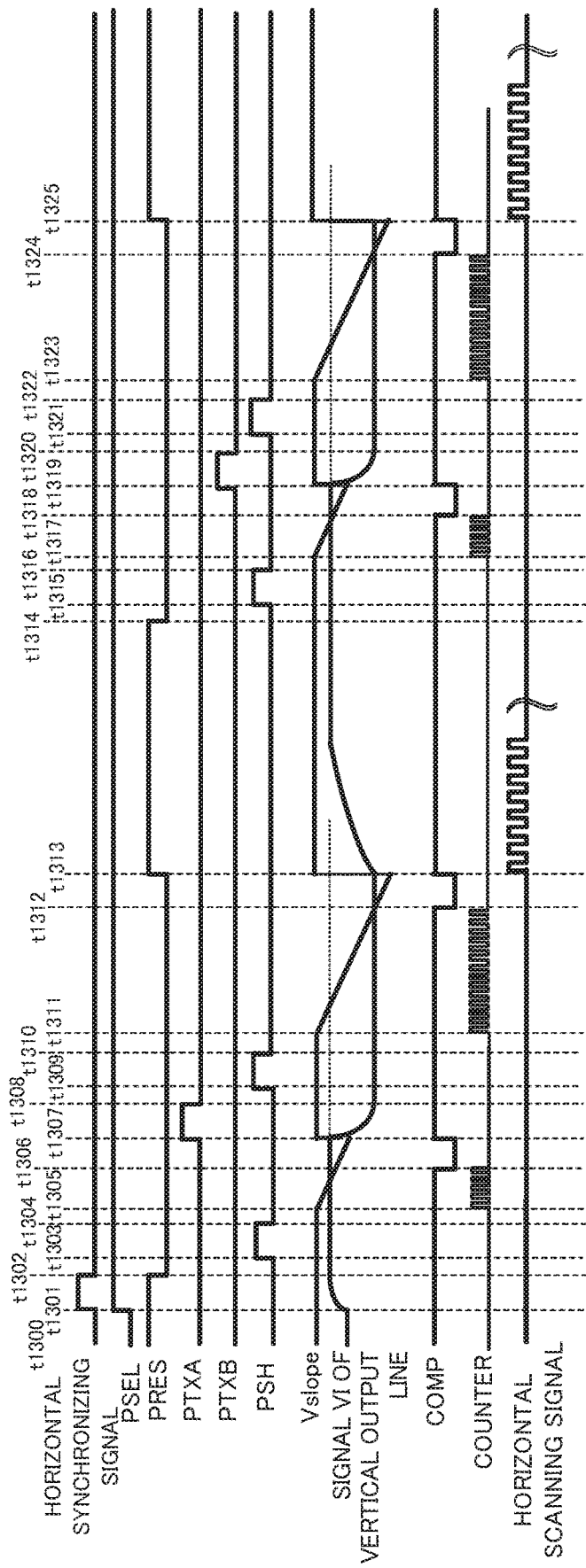
FIG. 13 is a timing chart of illustrating a signal read operation in an imaging-plane phase difference AF mode in a second embodiment.

Referring to FIG. 13, a charge reading operation in the imaging-plane phase difference AF mode (second mode or third drive mode) in this embodiment will be described. In the third drive mode (second mode), the A image signal and the B image signal are individually read from divided pixels to be output as pixel signals for focus detection. FIG. 13 is a timing chart of illustrating the signal reading operation in the imaging-plane phase difference AF mode (second mode). Processing during a period up to time t1313, i.e., processing until the S (A) signal obtained by the analog-to-digital conversion is stored in the memory 515, is the same as the drive during the period up to time t713 in the imaging-plane phase difference AF mode (second drive mode) of the first embodiment illustrated in. FIG. 7, and accordingly descriptions thereof are omitted.

The processing during the period up to time t1313 is a reading operation of the A image signal, and the B image signal is read from time t1313 with the similar drive. At time t1313, the control signal PRES of the reset switch 503 is set to Hi, and the gate of the SF 505 is reset to the reset power source voltage. Then, the control signal PRES is set to Lo at time t1314, the reset of the FD 504 is removed. The potential of the FD 504 at this time is read as a reset signal level (N signal) to the vertical output line 401 to be input to the column circuit 403. Subsequently at times t1315 and t1316, the control signal PSH is set to Hi and Lo to turn the switch 511 on and off, respectively. Thus, the N signal read to the vertical output line 401 is amplified by the amplifier 510 with a desired gain to be maintained in the capacitance 512. The potential of the N signal stored in maintained in the capacitance 512 is input to one of the comparator 513.

After the switch 511 is turned off at time t1316, from time t1317 to time t1319, the slope voltage generation circuit 404 decreases the reference voltage Vslope from an initial value with the passage of time. The clock CLK is supplied to the counter 514 simultaneously with the start of the transition of the reference voltage Vslope. A value of the counter 514 increases depending on the digit of the clock CLK. When the reference voltage Vslope input to the comparator 513 becomes the same level as that of the N signal, an output COMP of the comparator 513 is changed to the low level and simultaneously the operation of the counter 514 stops (time t1318). The value obtained when the operation of the counter 514 stops corresponds to a value obtained by performing the A/D conversion of the N signal, and it is stored in an N signal memory 515.

Subsequently, at time t1319 and time t1320 after the digitalized N signal is stored in the N signal memory 515, a control signal PTXB is sequentially set to Hi and Lo, and thus photocharges accumulated in the PD 201B are transferred to the FD 504. In this case, a potential fluctuation of the FD 504 depending on an amount of charges is read as an S signal level (light component+reset noise component (N signal)) to the vertical output line 401 to be input to the column circuit 403. The S signal is amplified by the amplifier 510 with a desired gain, and it is maintained in the capacitance 512 at the timing when the control signal PSH is sequentially set to Hi and Lo to turn the switch 511 on and off at time t1321 and t1322, respectively. The potential maintained in the capacitance 512 is input to one of the comparator 513. After the switch 511 is turned off at time t1322, from time t1323 to time t1325, the slope voltage generation circuit 404 decreases the reference voltage Vslope from an initial value with the passage of time. The clock CLK is supplied to the counter 514 simultaneously with the start of the transition of the reference voltage Vslope. The value of the counter 514 increases depending on the digit of the clock CLK. When the reference voltage Vslope input to the comparator 513 becomes the same level as that of the S signal, the output COMB of the comparator 513 is changed to the low Level and simultaneously the operation of the counter 514 stops (time t1324). The value obtained when the operation of the counter 514 stops corresponds to a value obtained by performing the A/D conversion of the S signal, and it is stored in a memory 516 as one of S signal memories. The S signal corresponds to a signal where photocharges accumulated in the PD 201B are combined (added) by the PD 504 to be read, and hereinafter it is referred to as an "S(B) signal". The step of reading the signals stored in the memories 515 and 516 by the horizontal scanning circuit 205 is the same operation as that described in the first embodiment, and accordingly, descriptions thereof are omitted.

As described above, first, only the control signal PTXA is set to be on to read the A image signal, then the control signal PTXB is set to be on to read the B image signal, and accordingly the information on the AF can be acquired. The A image signal and the B image signal read described above can be synthesized (i.e, combined) with each other by the image processing circuit 106b (synthesis processing circuit) of the control apparatus 106 to be used as a pixel signal of one pixel for a photographed image.

Figure 14:
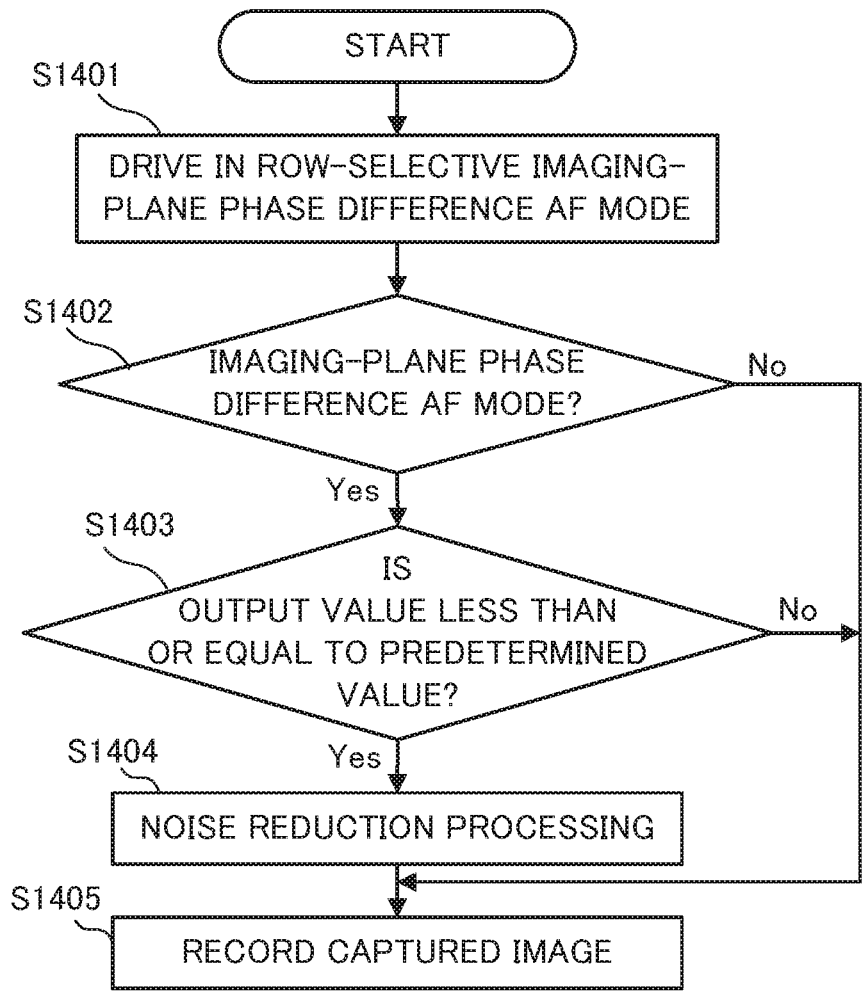
FIG. 14 is a flowchart of illustrating noise reduction processing in the second embodiment.

By switching between the second mode (third drive mode) and the first mode (first drive mode), the row-selective imaging-plane phase difference AF mode as illustrated in FIG. 8 can be achieved. In the second mode (third drive mode), when the A image signal and the B image signal are individually (independently) read and then they are synthesized to obtain the A+B image signal, it is known that the noise increases compared to the A+B image signal obtained in the first mode. As a result, a noise difference occurs depending on a row, and a horizontal stripe noise occurs as a factor of a deterioration of a quality of an image if the noise difference is large. Referring to FIG. 14, noise reduction processing in this embodiment will be described.

FIG. 14 is a flowchart of illustrating the noise reduction processing in the row-selective imaging-plane phase difference AF mode. Each step in FIG. 14 is performed by the image processing circuit 106b (noise reduction processing circuit) of the control apparatus 106 in the image pickup apparatus 100 in order to create the photographed image (captured image).

First, at step 31401, the control apparatus 106 performs a drive in which the row-selective imaging-plane phase difference AF mode, i.e., imaging-plane phase difference AF mode (second mode or third drive mode) for each row of the image sensor 103 and the normal photographing mode (first mode) are mixed. Accordingly, the pixel signal (image signal) read in the first mode and the pixel signal (image signal) read in the second mode from the image sensor 103 are read to be input to the control apparatus 106. The control apparatus 106 (image processing circuit 106b) uses the A+B image signal for a row read in the first mode directly as a photographed (captured) image signal. Furthermore, the control apparatus 106 synthesizes the A image signal and the B image signal for a row read in the second mode with each other, and then it temporarily stores the synthesized signal as the photographed image signal.

Subsequently, at step S1402, the control apparatus 106 determines whether or not the image signal is read in the imaging-plane phase difference AF mode. When the image signal is not read in the imaging-plane phase difference AF mode, i.e, the image signal is read in the normal photographing mode, the flow proceeds to step S1405 and it records the photographed image (captured image). On the other hand, when the image signal is read in the imaging-plane phase difference AF mode, the flow proceeds to step S1403. As described above, the control apparatus 106 reads the temporarily-stored image signal (photographed image signal), and also at subsequent steps, it starts determination of noise reduction processing and the processing on the A+B image signal that is read and generated in the imaging-plane phase difference AF mode.

The noise reduction processing is to be performed on the pixel signals obtained by the drive in the imaging-plane phase difference AF mode, and it is not to be performed on the pixel signals obtained in the normal photographing mode. This is because the pixel signal obtained in the imaging-plane phase difference AF mode becomes a pixel signal similarly to the pixel signal for the photographed image, and the noises occurring in the image sensor 103 also are added to increase according to the synthesis.

At step S1403, the control apparatus 106 determines whether or not an output value of the A+B image signal generated based on the pixel signal read in the imaging-plane phase difference AF mode is not greater than a predetermined value. When the output value of the image signal is not greater than the predetermined value, the flow proceeds to step S1404, and the control apparatus 106 (image processing circuit 106b) performs the noise reduction processing. The deterioration of the image due to the influence of the noise is noticeable in a small light amount area where the light, signal is low. Accordingly, the noise reduction processing is performed on noticeable conditions that the noise is dominant in the image. For example, the noise reduction processing is performed for a level of the output value not greater than a quarter of the output value as an appropriate level of an exposure amount in the image pickup apparatus 100.

Subsequently, at step S1404, the control apparatus 106 performs the noise reduction processing. For example, the control apparatus 106 uses output values of adjacent pixels with the same color in upward and downward directions and pixels driven for a normal photographed image with respect to the image signal as a target of the noise reduction processing to perform the noise reduction processing by median filtering processing. Since the selection of the drive, is performed on each row, the noise reduction processing by the median filtering processing is similarly performed on each row. Accordingly, it is possible to achieve the reduction of noticeable noises on lines for each row. The reason why the median filtering processing including pixel outputs by the drive for the normal photographing pixel is applied is that the noise reduction processing where the influence of the noise is effectively excluded by including the pixel outputs where the noise does not increase.

The filter that is to be used for the filtering processing is not limited to the median filtering processing. For example, the present invention is similarly effective also to the configuration where processing is performed on the same image by using a plurality of various filter coefficients and its result is weighted and added. When the filtering processing is to be performed, the weight of the filter or a filtering reaction may be changed based on a drive mode in which peripheral pixels are read.

As described above, in the row-selective imaging-plane phase difference AF mode drive where different drives are performed depending on a row in a frame, it is possible to perform appropriate noise reduction processing when divided pixels are independently read in the imaging-plane phase difference AF mode and then signals are synthesized to be used for the photographed image. The noise reduction processing described in this embodiment is an example, and the present invention is not limited thereto. The noise reduction processing may be performed on the photographed image signal obtained in the first mode. In this case, the noise reduction processing on the photographed image signal synthesized based on signals in the second mode (third drive mode) can be enhanced compared to that in the first mode.

In the second mode (third drive mode) of this embodiment, while the case where the A image signal and the B image signal are individually (separately) read is described as an example, as described in the first embodiment, this embodiment can be applied also to the operation where first the A image signal is read and then the A+B image signal is read.

<First Modification>

Figure 15:
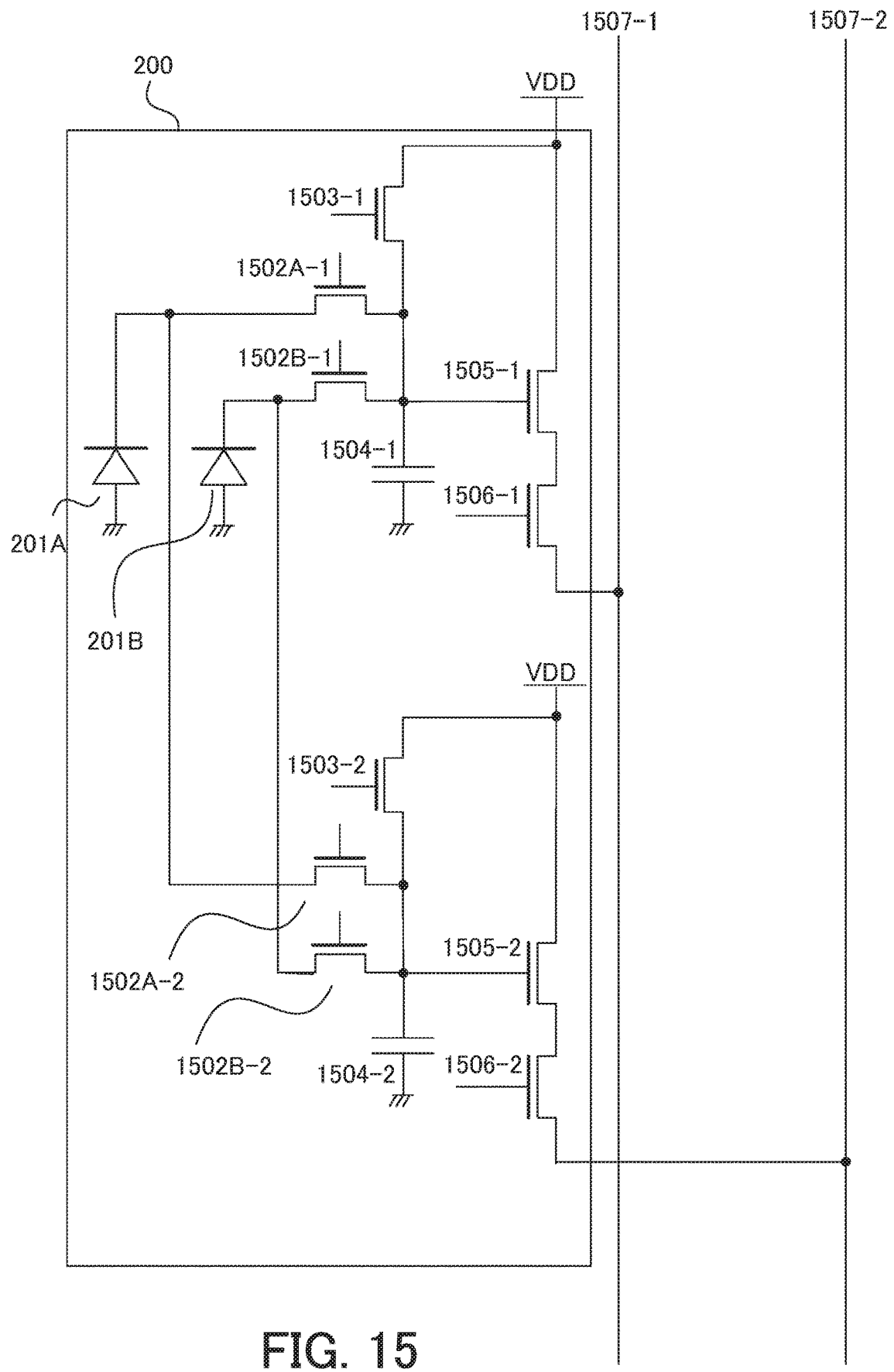
FIG. 15 is an explanatory diagram of a pixel circuit of an image sensor in a first modification of the second embodiment.

Next, referring to FIGS. 15 to 17, a first modification in this embodiment will be described. FIG. 15 is a diagram of a pixel circuit of the unit pixel 200 of the image sensor 103 in this modification.

In the unit pixel 200, a PD 201A (subpixel) is connected to transfer switches 1502A-1 and 1502A-2, and a PD 201B is connected to transfer switches 1502B-1 and 1502B-2. The transfer switches 1502A-1 and 1502B-1 are connected to a FD 1504-1. On the other hand, the transfer switches 1502A-2 and 1502B-2 are connected to a FD 1504-2. Charges accumulated by the PD 201A can be transferred to the FD 1504-1 via the transfer switch 1502A-1, and also they can be transferred to the FD 1504-2 via the transfer switch 1502A-2. Similarly, charges accumulated by the PD 201B can be transferred to the FD 1504-1 via the transfer switch 1502B-1, and also they can be transferred to the FD 1504-2 via the transfer switch 1502B-2.

The FDs 1504-1 and 1504-2 are connected to reset switches 1503-1 and 1503-2 and SFs 1505-1 and 1505-2, respectively. Furthermore, the SFs 1505-1 and 1505-2 are connected to selecting switches 1506-1 and 1506-2, respectively. Charges transferred to the FDs 1504-1 and 1504-2 are temporarily stored and they are converted into a voltage to be output from the SFs 1505-1 and 1505-2. Drains of the reset switches 1503-1 and 1503-2 and the SFs 1505-1 and 1505-2 share a reference voltage VDD (reference potential). The reset switch 1503-1 resets a potential of the FD 1504-1 and potentials of the PDs 201A and 201B is the transfer switches 11502A-1 and 1502B-1 to the reference voltage VDD. The reset switch 1503-2 resets a potential of the FD 1504-2 and potentials of the PDs 201A and 201B via the transfer switches 1502A-2 and 1502B-2 to the reference voltage VDD.

The selecting switches 1506-1 and 1506-2 output pixel signals output from the SFs 1505-1 and 1505-2 to vertical output lines 1507-1 and 1507-2, respectively. In this modification, while two vertical output lines are provided since the unit pixel is divided into two as divided pixels, a plurality of vertical output lines depending on the number of the divided pixels if the unit pixel is divided into four or more. The transfer switches, the reset switches, and the selecting switches are controlled by control signals PTX, PRES, and PSEL, respectively, is signal lines (not illustrated) connected to the vertical scanning circuit 408.

Also in the image sensor with the circuit configuration illustrated in FIG. 15, signals can be read in the normal photographing mode and the imaging-plane phase difference AF mode. The signal reading operation by the normal photographing mode can be achieved by driving one of the transfer switches, the reset switches, and the selecting switches according to the timing chart illustrated in FIG. 6, and accordingly, descriptions thereof are omitted. It is possible to read a signal at a certain row from the vertical output line 1507-1 and simultaneously read a signal at another row from the vertical output line 1507-2. In this case, the pixel signals at two rows can be read at the same time, and accordingly it is possible to perform high-speed reading and effective reading during the normal photography.

Figure 16:
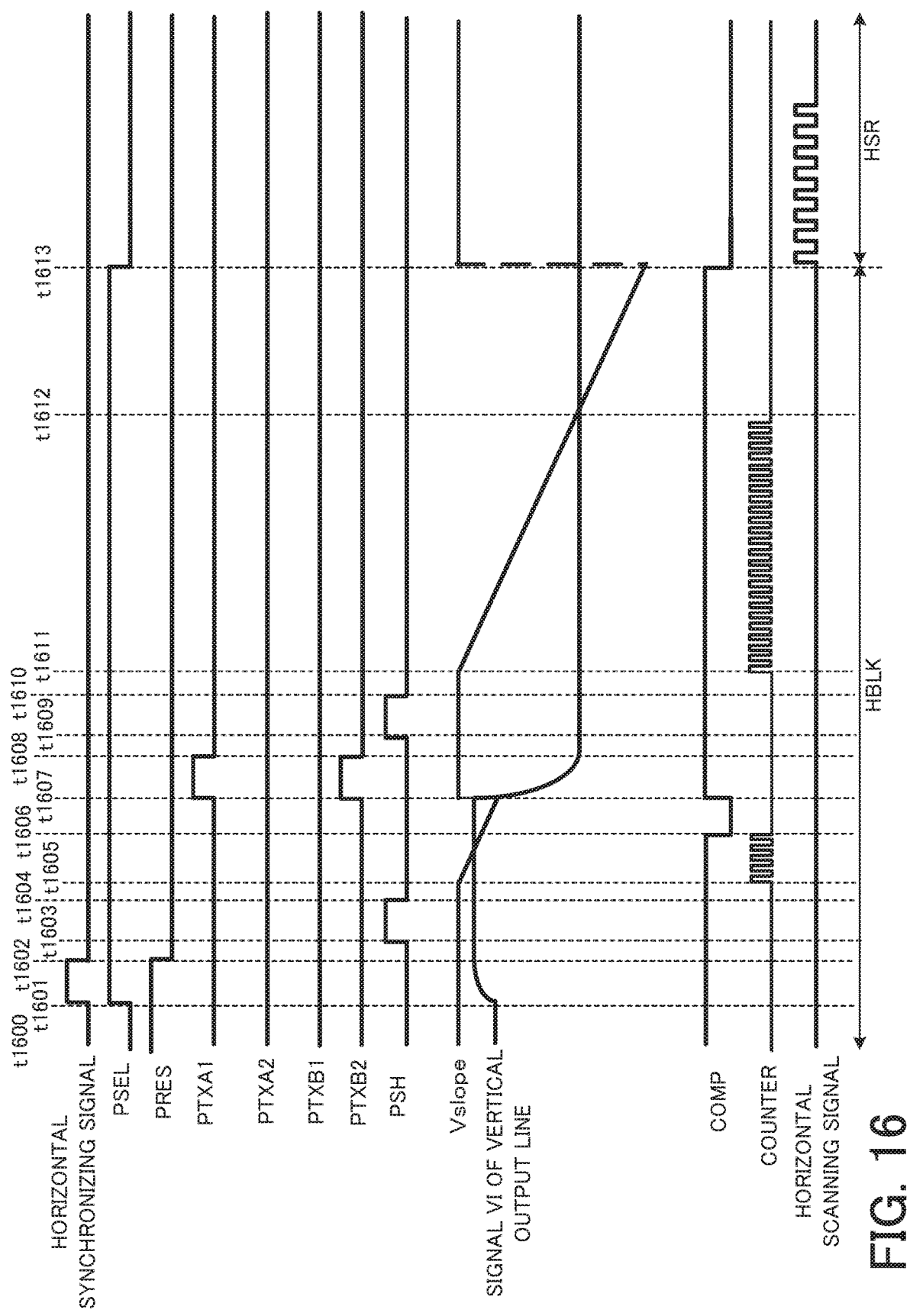
FIG. 16 is a timing chart of illustrating a signal read operation in an imaging-plane phase difference AF mode in the first modification of the second embodiment.

Referring to FIG. 16, a charge reading operation in the imaging-plane phase difference AF mode (second mode or fourth drive mode) in this embodiment will be described. FIG. 16 is a timing chart of illustrating the signal reading operation in the imaging-plane phase difference AF mode (fourth drive mode). With respect to FIG. 16, only the operations different from those in the normal photographing mode (first mode) will be described.

At time t1607 and time t1608, the control signals PTXA1 and PTXB2 are set to Hi and Lo, and thus photocharges accumulated in the PDs 201A and 201B are transferred to the FDs 1504-1 and 1504-2, respectively. In this case, potential fluctuations of the FDs 1504-1 and 1504-2 depending on amounts of charges are read as S signal levels (light components+reset noise components (N signals)) to the vertical output lines 1507-1 and 1507-2 to be input to the column circuit 403.

According to the drive as described above, the A image signal and the B image signal can be read from the vertical output lines 1507-1 and 1507-2, respectively. Furthermore, as illustrated in the timing charts of FIGS. 6 and 15, a time required to perform one horizontal reading operation, i.e., a sum of a vertical transfer time HBLK and a horizontal transfer time HSR can be equal to each other in between the normal photographing mode and the imaging-plane phase difference AF mode.

Figure 17:
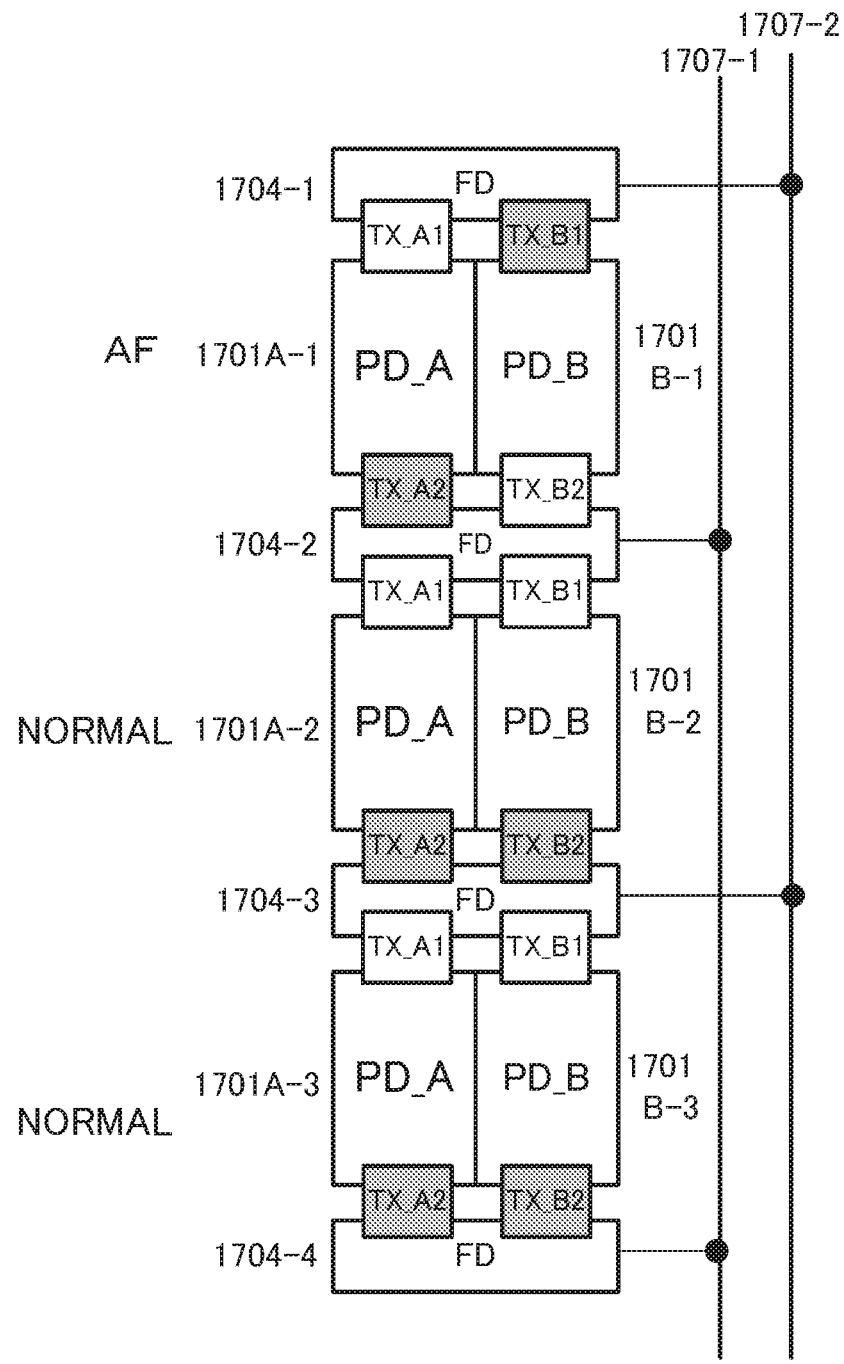
FIG. 17 is an explanatory diagram of a signal read operation in a row-selective imaging-plane phase difference AF mode in the first modification of the second embodiment.

FIG. 17 is an explanatory diagram of a signal reading operation in the row-selective imaging-plane phase difference AF mode. It corresponds to an example of one row which is read in the imaging-plane phase difference AF mode (second mode or fourth drive mode) and two rows which are to be read in the normal photographing mode (first mode), corresponding to sixth to eighth rows illustrated in FIG. 8. In the configuration of FIG. 17, the FD is shared by pixels at adjacent rows (adjacent pixels in a column direction).

An example of the reading operation in the imaging-plane phase difference AF mode (second mode or fourth drive mode) for a first row in FIG. 17 will be described. Charges accumulated in PD_A (1701A-1) of the unit pixel are output to a vertical output line 1707-1 via a FD 1704-2 by setting a transfer switch TX_A2 to be on. On the other hand, charges accumulated in PD_B (1701B-1) are output to a vertical output line 1707-2 via a FD 1704-1 by setting a transfer switch TX_B1 to be on. The outputs of the PD_A and PD_B read via different vertical output lines from each other can be combined (added) by the control apparatus 106 at the latter stage or the like to be used as a photographed image (captured image).

Next, an example of the reading operation in the normal photographing mode (first mode) for second and third rows in FIG. 17 will be described. Charges accumulated in PD_A (1701A_2) and the PD_B (1701B-2) of the unit pixel are output to the vertical output line 1707-2 via a FD 1704-3 by setting transfer switches TX_A2 and TX_B2 to be on. At the same time, charges accumulated in PD_A (1701A-3) and PD_B (1701B-3) of the unit pixel are output to the vertical output line 1707-1 via a FD 1704-4 by setting the transfer switches TX_A2 and TX_B2 to be on.

Thus, the way of reading operation where the normal photographing mode and the imaging-plane phase difference AF mode are mixed depending on a row in a frame can be achieved. As described above, the times required to perform one horizontal reading operation in between the normal photographing mode and the imaging-plane phase difference AF mode are equal to each other. In other words, also in the row-selective imaging-plane phase difference AF mode where the normal photographing mode and the imaging-plane phase difference AF mode are mixed, a slit rolling operation can be achieved without varying an accumulation time, i.e., exposure amount, depending on a row.

While the A image signal and the B image signal that are read in the imaging-plane phase difference mode can be combined (added) to be used as a pixel signal corresponding to one pixel for a photographed image (captured image), as described in the second embodiment, the noise included in the combined signal increases compared to that included in the signal read in the normal photographing mode. Accordingly, in this modification, similarly to the second embodiment, the noise reduction processing is performed according to the flowchart of FIG. 14 and thus an appropriate photographed image can be acquired.

<Second Modification>

Figure 18:
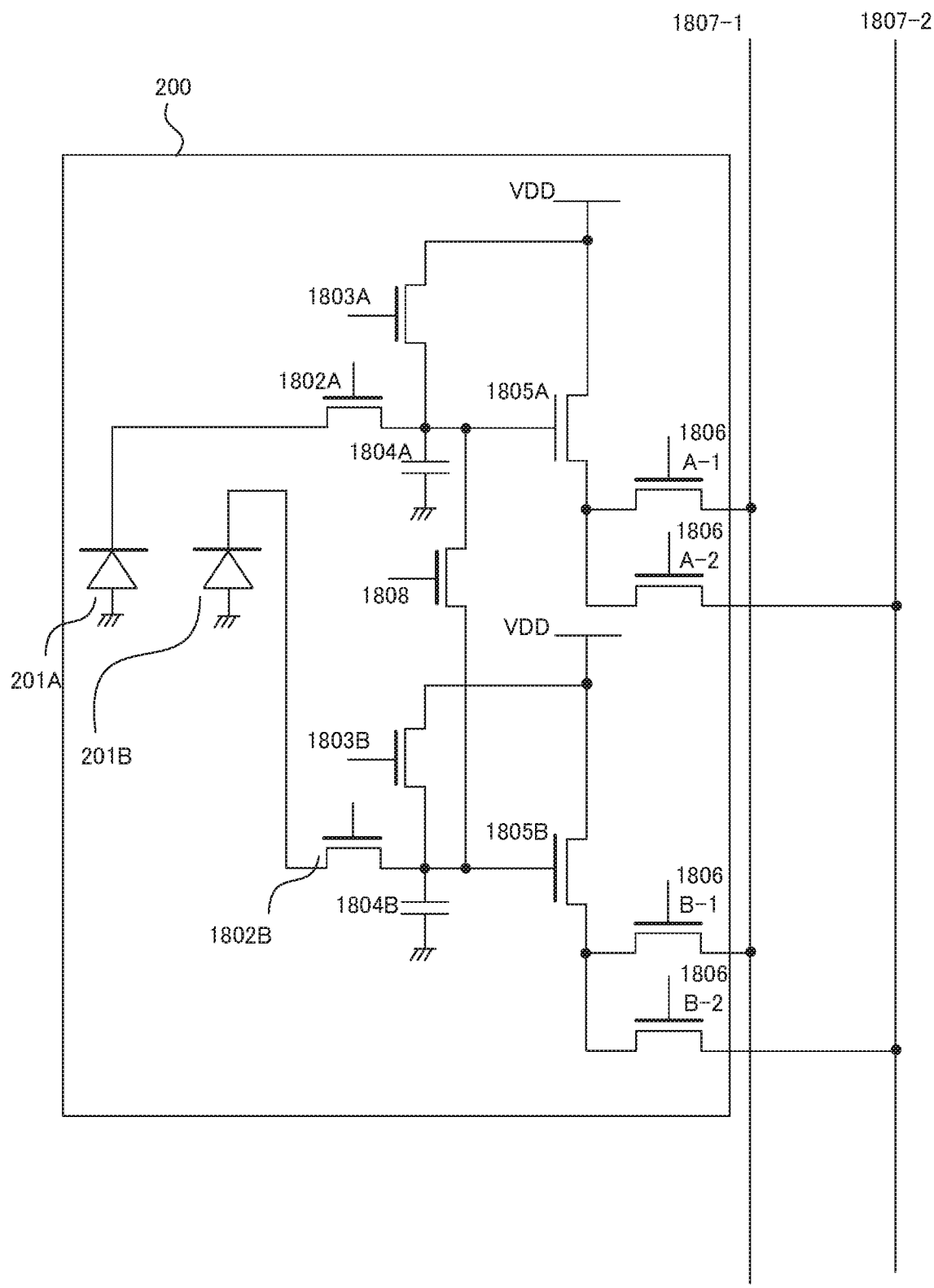
FIG. 18 is an explanatory diagram of a pixel circuit of an image sensor in a second modification of the second embodiment.

Next, referring to FIGS. 18 to 21, a second modification in this embodiment will be described. FIG. 18 is a diagram of a pixel circuit of the unit pixel 200 of the image sensor 103 in this modification.

In the unit pixel 200, a PD 201A (subpixel) is connected to a transfer switch 1802A, and a PD 201B (subpixel) is connected to a transfer switch 1802B. The transfer switch 1802A is connected to a FD 1804A. On the other hand, the transfer switch 1802B is connected to a FD 1804. Charges accumulated by the PD 201A are transferred to the FD 1804A via the transfer switch 1802A, and charges accumulated by the PD 201B are transferred to the FD 1804B via the transfer switch 1802B. The FD 1804A is connected to a reset switch 1803A and a SF 1805A. The SF 1805A is connected to selecting switches 1806A-1 and 1806A-2, and it outputs the charges accumulated by the PD 201A to a vertical output line 1807-1 or 1807-2 according to controls of the selecting switches 1806A-1 and 1806A-2, respectively. Similarly, the FD 1804B is connected to a reset switch 1803B and a SF 1805B. The SF 1805B is connected to selecting switches 1806B-1 and 1806B-2, and it outputs the charges accumulated by the PD 201B to the vertical output line 1807-1 or 1807-2 according to controls of the selecting switches 1806B-1 and 1806B-2, respectively. Furthermore, the charges of the FDs 1804A and 1804B can be combined (added) to each other by setting an addition switch 1808 to be on. The transfer switch, the reset switch, and the selecting switch are controlled by control signals PTX, PRES, and PSEL, respectively, signal lines (not illustrated) connected to the vertical scanning circuit 408.

Figure 19:
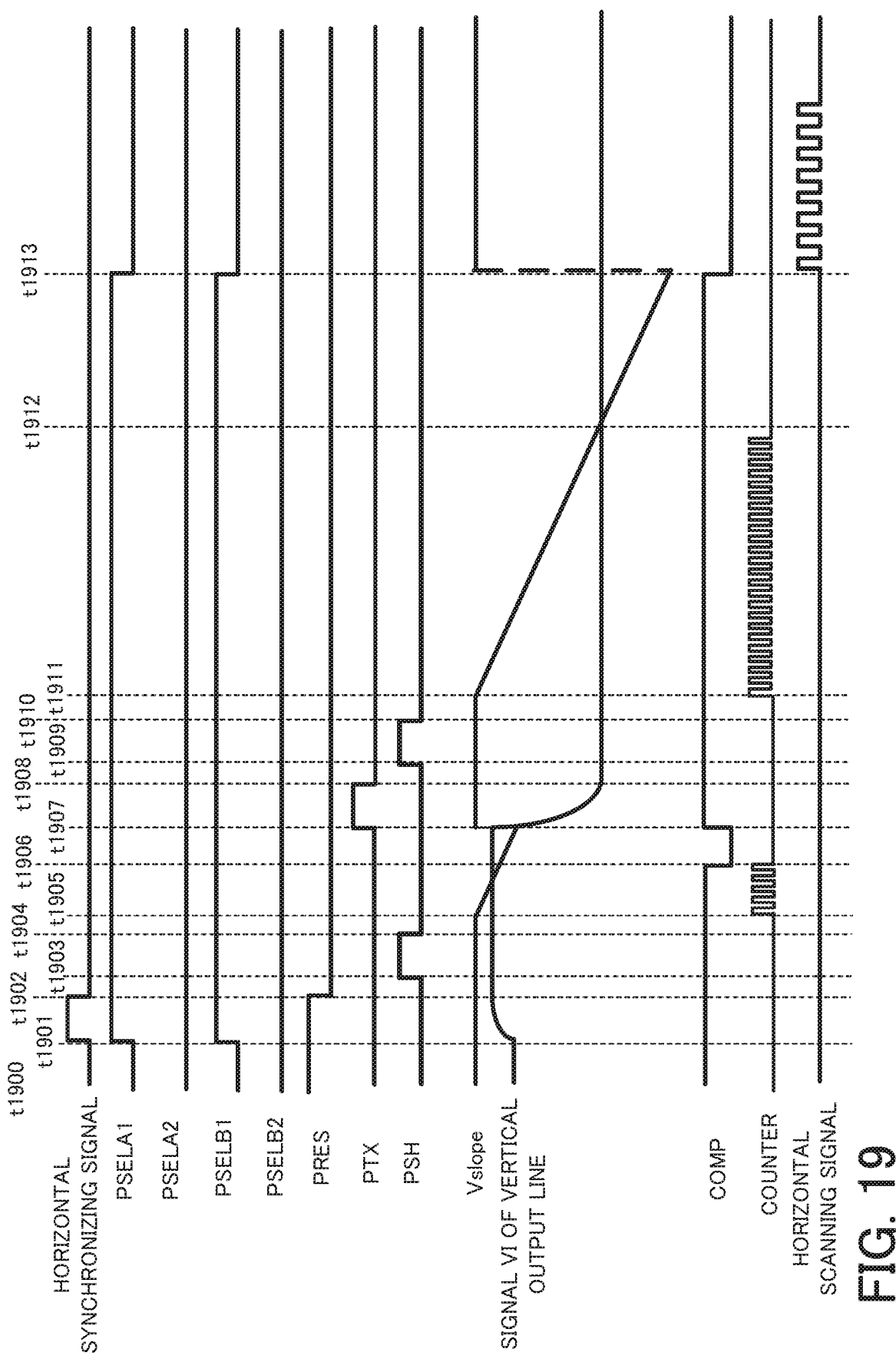
FIG. 19 is a timing chart of illustrating a signal read operation in a normal photographing mode in the second modification of the second embodiment.
Figure 20:
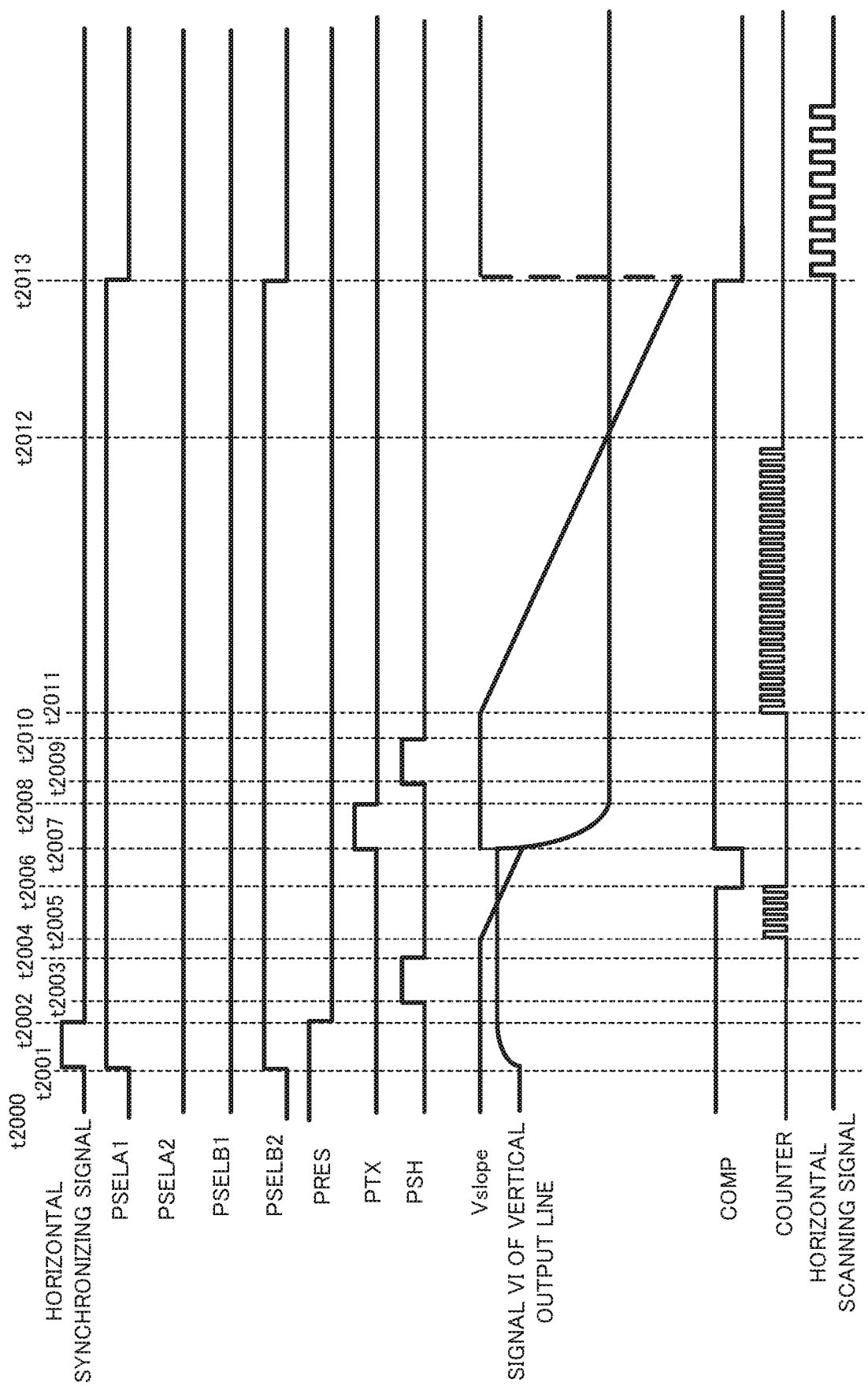
FIG. 20 is a timing chart of illustrating a signal read operation in an imaging-plane phase difference AF mode in the second modification of the second embodiment.

Also in the image sensor with the circuit configuration illustrated in FIG. 18, signals can be read in the normal photographing mode and the imaging-plane phase difference AF mode. Referring to FIGS. 19 and 20, an example of the reading operation will be described.

FIG. 19 is a timing chart of illustrating the signal reading operation in the normal photographing mode. In the normal photographing mode, a signal from the PD 201A and a signal from the PD 201B are output to the same vertical output line 1807-1, and the outputs are averaged on each vertical output line. Since the other vertical output line 1807-2 is excessive, signals of the PDs 201A and 201B are controlled to be output from another reading row. According to this reading operation, the pixel signals at two rows can be read at the same time, and accordingly it is possible to perform high-speed reading and effective reading during the normal photography.

Hereinafter, only the operations different from those of the timing chart illustrated in FIG. 6 will be described. At time t1901, control signals PSELA1 and PSELB1 are set to Hi to set the SES 1805A and 1805B to be in an operation state. Subsequent steps are as described referring to FIG. 6, and both of the resent switches 1803A and 1803B are controlled by driving the control signal PRES. Similarly, both of the transfer switches 1802A and 1802B are controlled by driving the control signal PTX. In the timing chart of FIG. 19, by setting the control signals PSELA1 and PSELB1 to Hi, the selecting switches 1806A-1 and 1806B-2 are set to be on, and as a result, charges accumulated in the PDs 201A and 201B are averaged and output via the vertical output line 1807-1. With respect to other rows, control signals PSELA2 and PSELB1 are set to be Hi and accordingly signals at two rows can be read at the same time. The charges can be combined (added) to each other to be output from the vertical output line by setting the addition switch 1808 to be on during the reading drive although it is not described in the timing chart of FIG. 19.

FIG. 20 is a timing chart of illustrating the signal reading operation in the imaging-plane phase difference AF mode (second mode or fifth drive mode). With respect to FIG. 20, only the operations different from those in the normal photographing mode will be described.

At time t2001, control signals PSELA1 and PSELB2 are set to Hi to set the SFs 1805A and 1805B to be in an operation state. Subsequent steps are as described referring to FIG. 6, and both of the resent switches 1803A and 18031B are controlled by driving the control signal PRES. By setting the control signals PSELA1 and PSELB2 to Hi, the selecting switches 1806A-1 and 1806B-2 are set to be on. As a result, charges accumulated in the PD 201A are output via the vertical output line 1807-1, and charges accumulated in the PD 201B are output via the vertical output line 1807-2.

According to the drive as described above, the A image signal and the B image signal can be read from the vertical output lines 1807-1 and 1807-2, respectively. Furthermore, as illustrated in the timing charts of FIGS. 19 and 20, a time required to perform one horizontal reading operation, i.e., a sum of a vertical transfer time HBLK and a horizontal transfer time HSR can be equal to each other in between the normal photographing mode and the imaging-plane phase difference AR mode.

Figure 21:
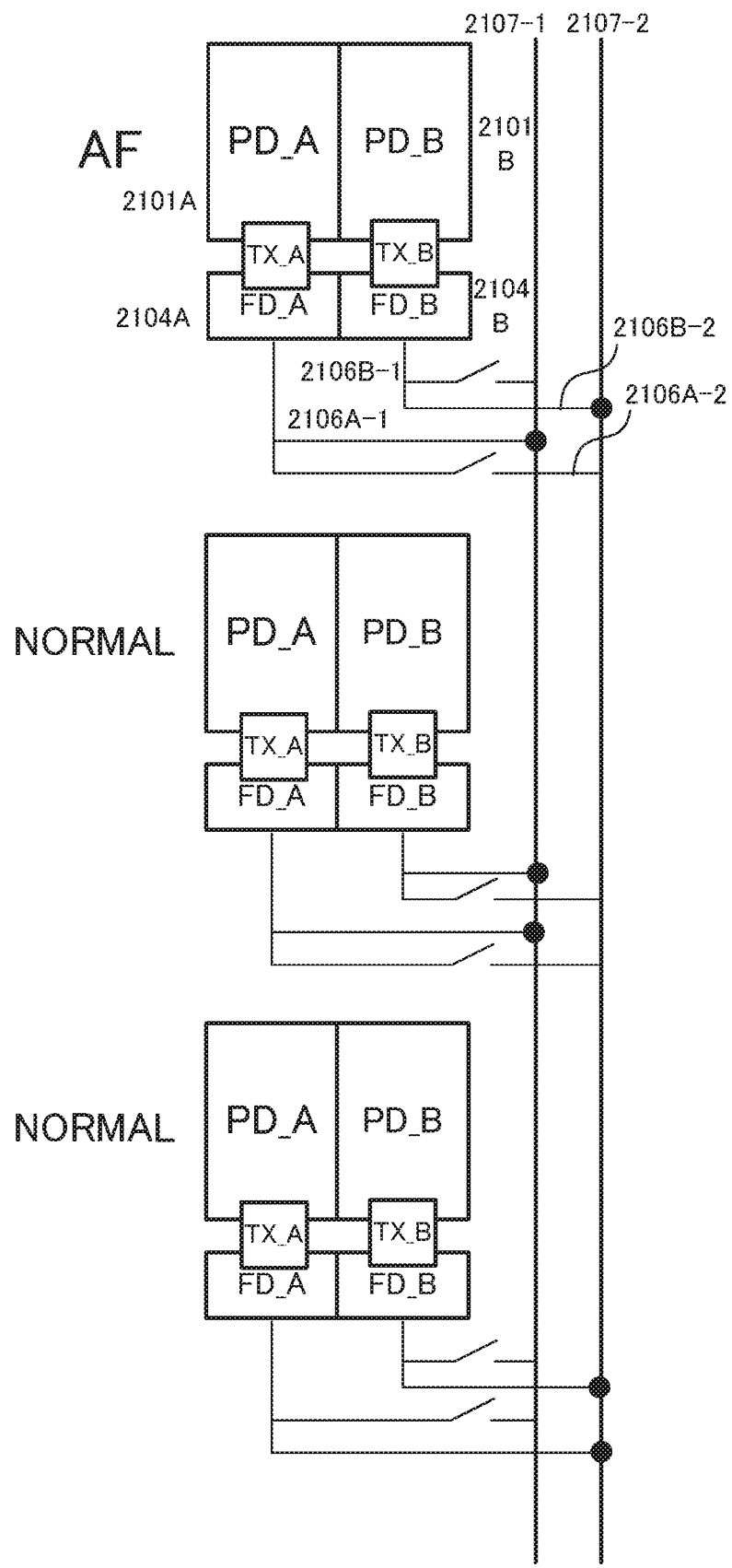
FIG. 21 is an explanatory diagram of a signal read operation in a row-selective imaging-plane phase difference AF mode in the second modification of the second embodiment.

FIG. 21 is an explanatory diagram of a signal reading operation in the row-selective imaging-plane phase difference AR mode. It corresponds to an example of one row which is read in the imaging-plane phase difference AR mode (second mode or fifth drive mode) and two rows which are to be read in the normal photographing mode, corresponding to sixth to eighth rows illustrated in FIG. 8.

An example of the reading operation in the imaging-plane phase difference AR mode (second mode or fifth drive mode) for a first row in FIG. 21 will be described. Charges accumulated in PD_A (2101A-1) of the unit pixel are transferred to a FD 210-1A by setting a transfer switch TX_A to be on, and they are output to a vertical output line 2107-1 by setting a selecting switch 2106A-1 to be on. On the other hand, charges accumulated in PD_B (2101B-1) are transferred to a FD 2104B by setting a transfer switch TX_B to be on, and they are output to a vertical output line 2107-2 by setting a selecting switch 2106B-2 to be on. The outputs of the PD_A and PD_B read via different vertical output lines from each other can be combined (added) or averaged by the control apparatus 106 at the latter stage or the like to be used as a photographed image (captured image).

Next, an example of the reading operation in the normal photographing mode for second and third rows in FIG. 21 will be described. Charges accumulated in PD_A (2101A) and the PD_B (2101B) of the unit pixel are output to the vertical output line 2107-1 for the second row and output to the vertical output line 2107-2 for the third row according to the controls of the selecting switches. Thus, the way of reading operation where the normal photographing mode and the imaging-plane phase difference AF mode are mixed depending on a row in a frame can be achieved. As described above, the times required to perform one horizontal reading operation in between the normal photographing mode and the imaging-plane phase difference AF mode are equal to each other. In other words, also in the row-selective imaging-plane phase difference AF mode where the normal photographing mode and the imaging-plane phase difference AF mode are mixed, a slit rolling operation can be achieved without varying an accumulation time, i.e., exposure amount, depending on a row.

The A image signal and the B image signal that are read in the imaging-plane phase difference mode can be combined (added) or averaged to be used as a pixel signal corresponding to one pixel for a photographed image (captured image). Whether combining processing or averaging processing is to be performed on the A image signal and the B image signal is determined depending on a reading method of the A+B image signal in the normal photographing mode. When the A image signal and the B image signal are averaged on the vertical output line to obtain the A+B image in the normal photographing mode, the averaging processing is performed on the A image signal and the B image signal to use the A+B image signal as a photographed image (captured image). In this case, a noise included in the A+B image signal obtained in the normal photographing mode is approximately the same as a noise included in the A+B image signal obtained in the imaging-plane phase difference AF mode. On the other hand, when the A image signal and the B image signal are combined on the FD to obtain the A+B image signal in the normal photographing mode, the combining processing of the A image signal and the B image signal is performed to use the A+B image signal as the photographed image. When a difference of amounts of charges in the PDs 201A and 201B is large, it is known that a shift (deviation) occurs with respect to a theoretical average potential if the averaging processing is performed on the vertical output line. Accordingly, the drive method may be switched so that the averaging processing is performed on the vertical output line in a low ISO setting where a large amount of charges exists, and on the other hand the signals are combined on the FD in a high ISO setting where a small amount of charges exists.

When the A+B image signal is obtained on the FD in the normal photographing mode, the noise included in the A+B image signal obtained by the imaging-plane phase difference AF mode increases compared to the noise included in the A-f-B image signal obtained by the normal photographing mode. Accordingly, also in this modification, as described above, the noise reduction processing is performed according to the flowchart of FIG. 14 and thus an appropriate photographed image can be acquired.

As described above, in each embodiment, the control apparatus 106 includes the acquirer (acquisition circuit 106a) and the image processor (image processing circuit 106b). The acquirer acquires the first imaging signal (A+B image signal) that is read in the first mode from the first pixel area of the image sensor 103 and the second imaging signal (at least one of the A image signal and the B image signal) that is read in the second mode from the second pixel area different from the first pixel area of the image sensor 103. The first imaging signal and the second imaging signal are combined to generate a photographed image (for each frame). The image sensor includes the plurality of photoelectric converters that correspond to a single microlens. The image processor performs the noise reduction processing on the first imaging signal and the second imaging signal. The first mode is a mode (normal photographing mode or first drive mode) in which pixel signals of the plurality of photoelectric converters are added to each other to be read from the image sensor. The second mode is a mode (imaging-plane phase difference AF mode, or second to fifth drive mode) in which a pixel signal of at least one of the plurality of photoelectric converters is read independently as a predetermined signal.

Alternatively, in the control apparatus 106, the image processor performs the noise reduction processing on the first imaging signal and the second imaging signal differently from each other, and reading period in the second mode, is longer than a reading period in the first mode.

Preferably, the acquirer acquires the first imaging signal and the second imaging signal in the first pixel area and the second pixel area, respectively, which are determined for each row at a predetermined rate in the same frame (FIG. 8). The predetermined signal is a focus detection signal. Preferably, the image processor determines whether or not to perform the noise reduction processing on the first imaging signal and the second imaging signal based on different references from each other with respect to the first imaging signal and the second imaging signal (FIG. 10: S1004 to S1007). More preferably, the image processor determines whether or not to perform the noise reduction processing on the first imaging signal based on a first reference as the reference. The image processor determines whether or not to perform the noise reduction processing on the second imaging signal based on a second reference lower than the first reference as the reference (S1004 to S1007). Preferably, the image processor detects a defective pixel with respect to each of the first imaging signal and the second imaging signal depending on the reference in each photography, and it corrects the defective pixel to perform the noise reduction processing. Preferably, the control apparatus includes a memory (internal memory of the control apparatus 106 or the memory circuit 107) which stores information relating to the defective pixel with respect to each of the first imaging signal and the second imaging signal. The image processor corrects the defective pixel based on the information relating to the defective pixel and the reference to perform the noise reduction processing. More preferably, the acquirer acquires a sensitivity of the image sensor. The image processor corrects the defective pixel based on a correction level depending on the sensitivity to perform the noise reduction processing (FIG. 10: S1002, S1006, FIG. 11).

Preferably, a first period (T1) that is required to store the first imaging signal in a memory of the image sensor is different from a second period (T2) that is required to store the second imaging signal in the memory. The image processor sets the different references from each other (expression (1): L1, L2) with respect to the first imaging signal and the second imaging signal depending on a relationship between the first period and the second period. More preferably, the second period with respect to the second imaging signal is longer than the first period with respect to the first imaging signal (FIGS. 6 and 7).

Preferably, the acquirer combines a pair of focus detection signals (predetermined signals) that are read in the second mode from the second pixel area to acquire the second imaging signal. The image processor performs the noise reduction processing on the second imaging signal when the second imaging signal is smaller than a predetermined value. On the other hand, the image processor does not perform the noise reduction processing on the second imaging signal when the second imaging signal is larger than the predetermined value (FIG. 14: S1403, S1404). More preferably, the image processor performs filtering processing by using the first imaging signal to perform the noise reduction processing when the second imaging signal is smaller than the predetermined value. More preferably, the image processor performs the filtering processing by median filtering processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

According to each embodiment, a control apparatus, an image pickup apparatus, and a control method which are capable of reducing a deterioration of a captured image while improving the speed of acquiring the captured image and performing focus detection can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168509, filed on Aug. 28, 2015, which is hereby incorporated by reference herein in its entirety.

What is claimed is:

1. A control apparatus comprising:
an acquirer configured to acquire a first imaging signal that is read in a first mode from a first pixel area of an image sensor and a second imaging signal that is read in a second mode from a second pixel area different from the first pixel area of the image sensor, the image sensor including a plurality of photoelectric converters that correspond to a single microlens; and
an image processor configured to perform noise reduction processing on the first imaging signal and the second imaging signal for generating a display image,
wherein:
the first mode is a mode in which pixel signals of the plurality of photoelectric converters are added to each other to be read from the image sensor,
the second mode is a mode in which a pixel signal of at least one of the plurality of photoelectric converters is read independently as a predetermined signal, and
the noise reduction processing reduces noise difference between the first imaging signal and the second imaging signal.

2. The control apparatus according to claim 1, wherein:
the acquirer is configured to acquire the first imaging signal and the second imaging signal in the first pixel area and the second pixel area, respectively, which are determined for each row at a predetermined rate in the same frame, and
the predetermined signal is a focus detection signal.

3. The control apparatus according to claim 1, wherein the image processor is configured to determine whether or not to perform the noise reduction processing on the first imaging signal and the second imaging signal based on different references from each other with respect to the first imaging signal and the second imaging signal.

4. The control apparatus according to claim 3, wherein the image processor is configured to:
determine whether or not to perform the noise reduction processing on the first imaging signal based on a first reference as the reference, and
determine whether or not to perform the noise reduction processing on the second imaging signal based on a second reference lower than the first reference as the reference.

5. The control apparatus according to claim 3, wherein the image processor is configured to:
detect a defective pixel with respect to each of the first imaging signal and the second imaging signal depending on the reference in each photography, and
correct the defective pixel to perform the noise reduction processing.

6. The control apparatus according to claim 3, further comprising a memory configured to store information relating to a defective pixel with respect to each of the first imaging signal and the second imaging signal,
wherein the image processor is configured to correct the defective pixel based on the information relating to the defective pixel and the reference to perform the noise reduction processing.

7. The control apparatus according to claim 5, wherein:
the acquirer is configured to acquire a sensitivity of the image sensor, and
the image processor is configured to correct the defective pixel based on a correction level depending on the sensitivity to perform the noise reduction processing.

8. The control apparatus according to claim 3, wherein:
a first period that is required to store the first imaging signal in a memory of the image sensor is different from a second period that is required to store the second imaging signal in the memory, and
the image processor is configured to set the different references from each other with respect to the first imaging signal and the second imaging signal depending on a relationship between the first period and the second period.

9. The control apparatus according to claim 8, wherein the second period with respect to the second imaging signal is longer than the first period with respect to the first imaging signal.

10. The control apparatus according to claim 1, wherein:
the acquirer is configured to combine a pair of predetermined signals that are read in the second mode from the second pixel area to acquire the second imaging signal,
the image processor is configured to perform the noise reduction processing on the second imaging signal when the second imaging signal is smaller than a predetermined value, and
the image processor is configured not to perform the noise reduction processing on the second imaging signal when the second imaging signal is larger than the predetermined value.

11. The control apparatus according to claim 10, wherein the image processor is configured to perform filtering processing by using the first imaging signal to perform the noise reduction processing when the second imaging signal is smaller than the predetermined value.

12. The control apparatus according to claim 11, wherein the image processor is configured to perform the filtering processing by median filtering processing.

13. The control apparatus according to claim 1, wherein the acquirer is configured to acquire the predetermined signal and the second imaging signal sequentially in the second mode.

14. An image pickup apparatus comprising:
an image sensor including a plurality of photoelectric converters that correspond to a single microlens; and
a controller having a processor which executes instructions stored in a memory or having a circuitry, the controller being configured to:
acquire a first imaging signal that is read in a first mode from a first pixel area of an image sensor and a second imaging signal that is read in a second mode from a second pixel area different from the first pixel area of the image sensor, and
perform noise reduction processing on the first imaging signal and the second imaging signal for generating a display image,
wherein:
the first mode is a mode in which pixel signals of the plurality of photoelectric converters are added to each other to be read from the image sensor,
the second mode is a mode in which a pixel signal of at least one of the plurality of photoelectric converters is read independently as a predetermined signal, and
the noise reduction processing reduces noise difference between the first imaging signal and the second imaging signal.

15. The image pickup apparatus according to claim 14, wherein:
- the image sensor includes a plurality of microlenses arrayed in two dimensions, each of the microlenses corresponding to the plurality of photoelectric converters, and
- in each frame, the image sensor is capable of reading the first imaging signal from the first pixel area in the first mode and reading the second imaging signal from the second pixel area in the second mode.

16. A control method comprising the steps of:
- acquiring a first imaging signal that is read in a first mode from a first pixel area of an image sensor and a second imaging signal that is read in a second mode from a second pixel area different from the first pixel area of the image sensor, the image sensor including a plurality of photoelectric converters that correspond to a single microlens; and
- performing noise reduction processing on the first imaging signal and the second imaging signal for generating a display image, wherein:
- the first mode is a mode in which pixel signals of the plurality of photoelectric converters are added to each other to be read from the image sensor,
- the second mode is a mode in which a pixel signal of at least one of the plurality of photoelectric converters is read independently as a predetermined signal, and
- the noise reduction processing reduces noise difference between the first imaging signal and the second imaging signal.

17. A control apparatus comprising:
- an acquirer configured to acquire a first imaging signal that is read in a first mode from a first pixel area of an image sensor and a second imaging signal and a focus detection signal that are read in a second mode from a second pixel area different from the first pixel area of the image sensor, the image sensor including a plurality of photoelectric converters that correspond to a single microlens; and
- an image processor configured to perform noise reduction processing on the first imaging signal and the second imaging signal for generating a display image differently from each other, wherein a reading period in the second mode is longer than a reading period in the first mode, and
the noise reduction processing reduces noise difference between the first imaging signal and the second imaging signal.

* * * * *